(12) United States Patent
Taubman

(10) Patent No.: US 6,778,709 B1
(45) Date of Patent: Aug. 17, 2004

(54) EMBEDDED BLOCK CODING WITH OPTIMIZED TRUNCATION

(75) Inventor: David S. Taubman, Pymble (AU)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/267,248

(22) Filed: Mar. 12, 1999

(51) Int. Cl.[7] .................................................. G06K 9/36
(52) U.S. Cl. ................ 382/240; 348/395.1; 348/398.1; 348/405.1; 348/408.1; 348/420.1; 358/426.14; 382/235; 382/248; 382/251; 375/240.11; 375/240.18; 375/240.21; 375/240.24
(58) Field of Search .............................. 358/426, 432, 358/426.01, 426.13, 426.14; 382/232–233, 239, 240, 248–253; 375/240.05, 240.11, 240.18, 240.21–240.24; 348/394.1, 395.1, 398.1, 405.1, 408.1, 420.1

(56) References Cited

U.S. PATENT DOCUMENTS

| | | | | |
|---|---|---|---|---|
| 5,276,525 A | * | 1/1994 | Gharavi | 382/245 |
| 5,321,776 A | * | 6/1994 | Shapiro | 382/240 |
| 5,481,308 A | * | 1/1996 | Hartung et al. | 375/240.11 |
| 5,825,935 A | * | 10/1998 | Murakoshi | 382/248 |
| 5,982,938 A | * | 11/1999 | Dube | 382/240 |
| 6,021,224 A | * | 2/2000 | Castelli et al. | 382/232 |
| 6,125,201 A | * | 9/2000 | Zador | 382/166 |
| 6,141,453 A | * | 10/2000 | Banham et al. | 382/240 |
| 6,160,846 A | * | 12/2000 | Chiang et al. | 375/240.05 |
| 6,259,819 B1 | * | 7/2001 | Andrew et al. | 382/248 |
| 6,263,109 B1 | * | 7/2001 | Ordentlich et al. | 382/232 |
| 6,263,110 B1 | * | 7/2001 | Andrew et al. | 382/232 |
| 6,266,450 B1 | * | 7/2001 | Yip et al. | 382/240 |
| 6,269,192 B1 | * | 7/2001 | Sodagar et al. | 382/240 |
| 6,298,167 B1 | * | 10/2001 | Martucci et al. | 382/248 |
| 6,314,452 B1 | * | 11/2001 | Dekel et al. | 709/203 |
| 6,337,929 B1 | * | 1/2002 | Kajiwara et al. | 382/239 |
| 6,347,157 B2 | * | 2/2002 | Chui | 382/240 |
| 6,381,280 B1 | * | 4/2002 | Lynch et al. | 375/240.19 |
| 6,389,074 B1 | * | 5/2002 | Andrew | 375/240.05 |

\* cited by examiner

*Primary Examiner*—Bhavesh M. Mehta
*Assistant Examiner*—Gregory Desire

(57) ABSTRACT

A multi-layer embedded bitstream is generated from a subband decomposition by partitioning each subband of the decomposition into a plurality of blocks; and encoding the blocks of each subband. The blocks of each subband are coded independently of each other. Resulting is a block bitstream corresponding to each block. Truncation points may be identified on the block bitstreams, and selected portions of the block bitstreams may be concatenated, layer-by-layer, to form the single-layer or multi-layer bitstream. Syntax information may also be added to the multi-layer bitstream. An image can be reconstructed from the embedded bitstream at a desired bit-rate or resolution by reading the syntax information, randomly accessing desired portions of the block bitstreams, decoding the randomly accessed portions, dequantizing the decoded portions, and applying an inverse transform to the dequantized portions.

32 Claims, 12 Drawing Sheets

FIGURE 1
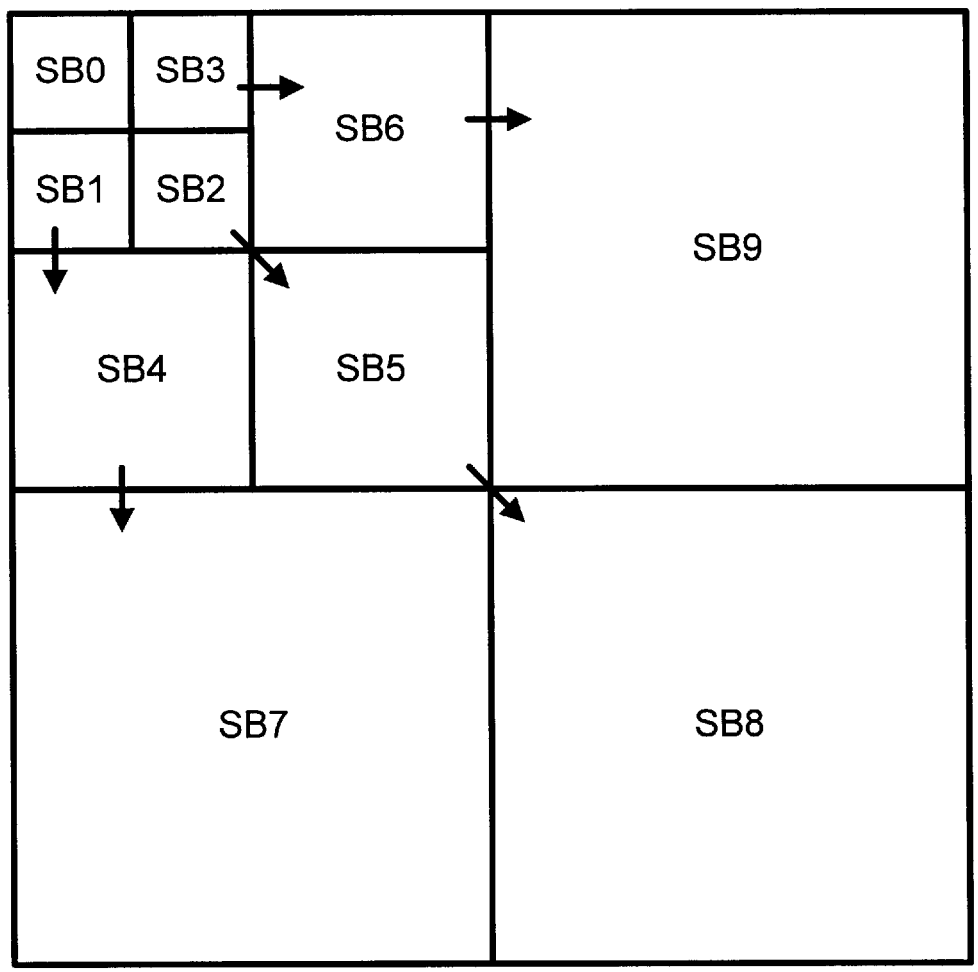
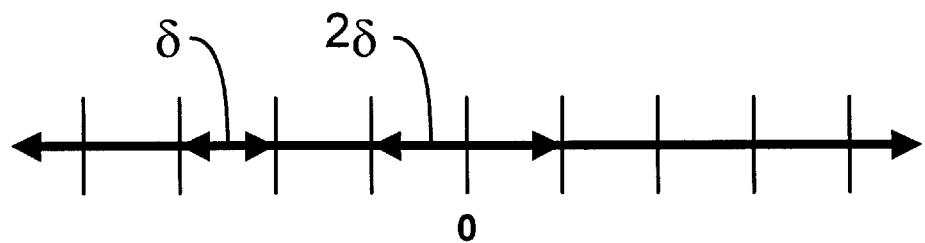
FIGURE 3

FIGURE 6
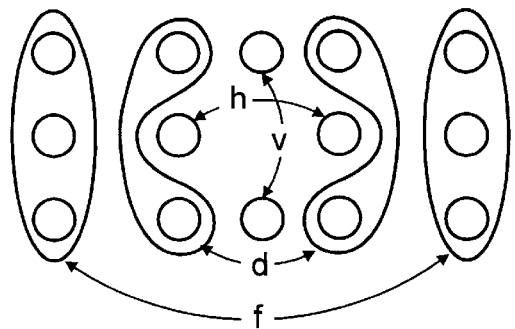
FIGURE 10
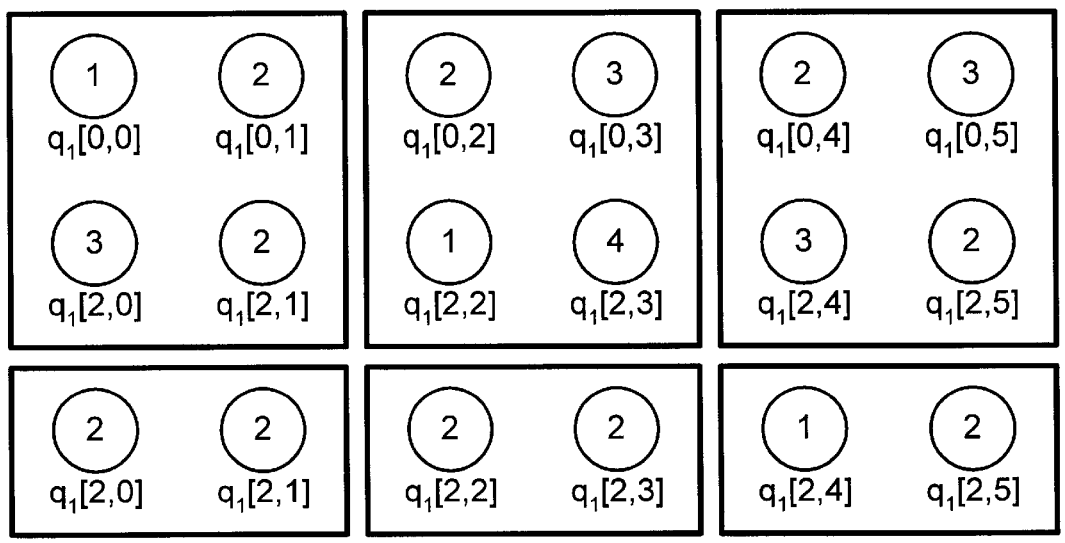
LEAF NODES
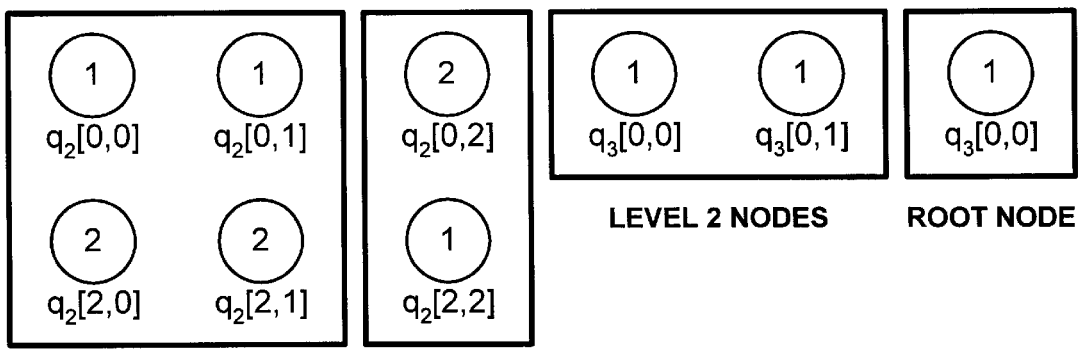
LEVEL 1 NODES   LEVEL 2 NODES   ROOT NODE

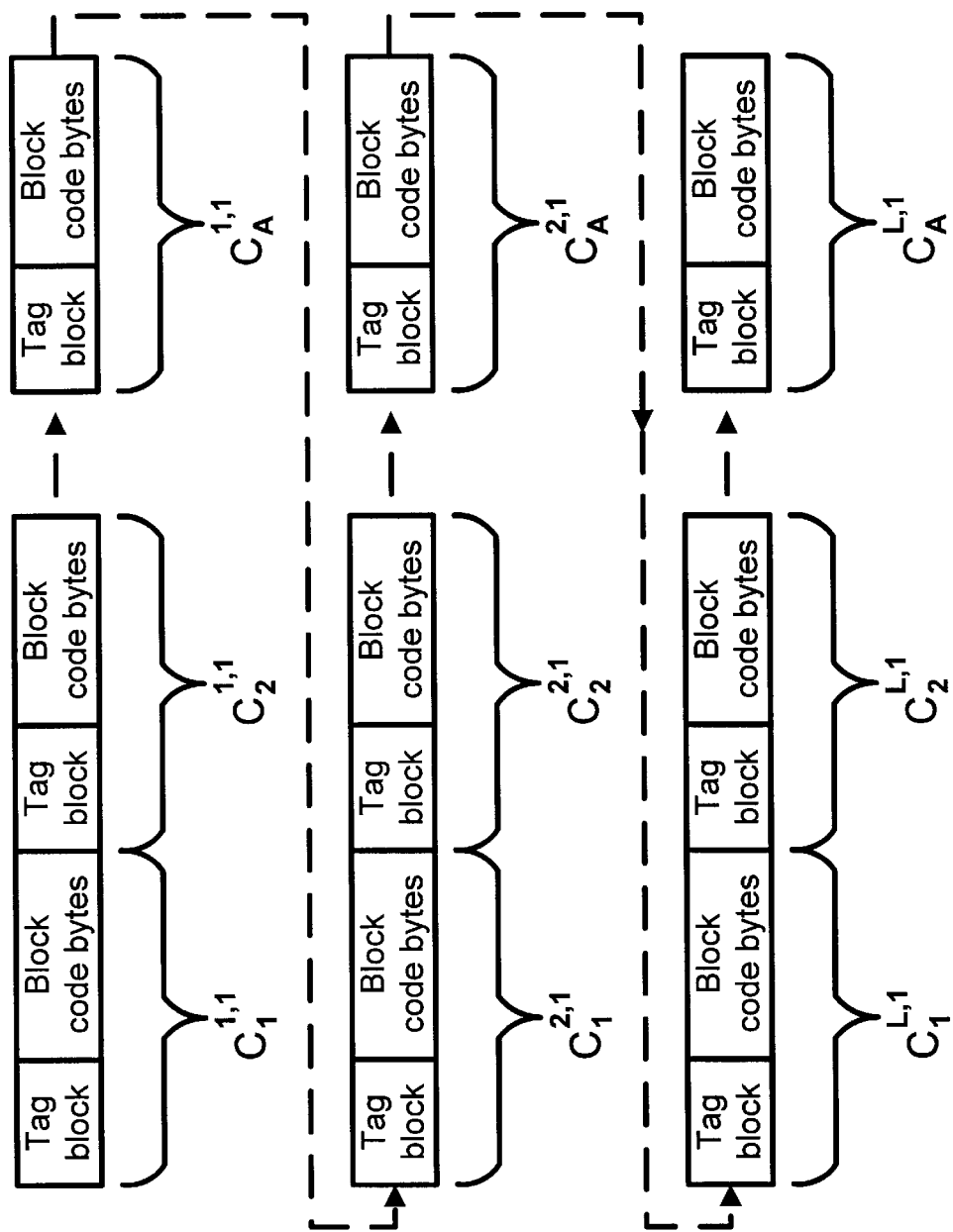

EMBEDDED BLOCK CODING WITH OPTIMIZED TRUNCATION

BACKGROUND OF THE INVENTION

The invention relates to data compression. More specifically, the invention relates to data coding and embedded bitstreams.

Data compression is often used for reducing the cost of storing large data files on computers as well as reducing the time for transmitting large data files between computers. In the so-called "transform methods" data is transformed into coefficients that represent the data in a frequency domain. Coefficients may be quantized (lossy compression) without significantly affecting the quality of data that is eventually reconstructed from the quantized coefficients. Redundancy in the coefficients may then be reduced or eliminated (lossless compression) without affecting quality of the reconstructed data.

One well known class of transforms are Wavelet transforms. The Wavelet transforms may be used to perform subband decomposition and produce coefficients that describe the data in a hierarchical multiscale representation. Wavelet transforms have proven useful for the compression of images and the analysis of signals. They have been proposed as the transforms for the emerging "JPEG-2000" standard.

Among the advantages of the Wavelet transforms, the transform coefficients can be ordered in a hierarchical structure and transmitted in an "embedded bitstream." The embedded bitstream has a property whereby prefixes of the bitstream yield a continuum of lower rate descriptions of the data at the highest possible levels of quality. If the embedded bitstream is truncated during transmission of image data, for instance, the information already transmitted allows an entire image to be reconstructed. The quality of the reconstructed image is dependent upon the amount information transmitted. If an embedded bitstream is truncated, a complete image of reduced quality can be reconstructed from the transmitted bits. In contrast, truncation of a non-embedded transmission might only allow several rows of an image to be reconstructed.

As additional information is transmitted, the quality of the reconstructed image is improved. If the entire bitstream is transmitted without truncation, a lossless or near-lossless image can be reconstructed.

The transmission just described is often referred to as a "progressive-by-quality" image transmission. The coefficients are described by bit-planes, and the most significant coefficient bits (that is, the coefficient bits conveying the most important information) are transmitted first.

Another type of transmission is often referred to as a "progressive-by-resolution" transmission. The progressive-by-resolution transmission involves ordering the coefficients according to different levels of image resolution. The different levels are identified by markers in the embedded bitstream. A computer may use the markers to parse the bitstream and transmit the data for the coefficients corresponding to a resolution that is specified by the receiving computer. The receiving computer can reconstruct an image according to the specified resolution.

Versatility is very desirable for systems that compress and reconstruct images. The following features for such systems are very desirable: scalability, random access, rate control and resolution control. Perhaps even more desirable is a system that can combine all of these features.

SUMMARY OF THE INVENTION

According to one aspect of the present invention, a subband decomposition can be processed by partitioning each subband into a plurality of blocks; and encoding the blocks of each subband, wherein a block bitstream is generated for each block. The blocks of each subband are coded independently of each other.

Such processing allows a layered embedded bitstream to be generated with greater scalability, random access, error resilience and coding efficiency.

It also allows for efficient rate control, low complexity, low memory and region-of-interest ("ROI") reconstruction. The present invention can be used to provide better support for client-server applications and greater flexibility for proprietary encoders to optimize the bitstream by exploiting "psycho-visual" properties without making any changes to the decoder or bitstream syntax.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is an illustration of a subband decomposition of an image;

FIG. 3 is an illustration of deadzone quantizer thresholds for quantization;

FIG. 6 is an illustration of neighbors involved in context formation for a Zero Coding operation;

FIG. 8 is an illustration of a first type of multi-layer bitstream;

FIG. 10 is an illustration of the organization of a four level tag tree built from an array of leaf nodes;

DETAILED DESCRIPTION OF THE INVENTION

Figure 2:
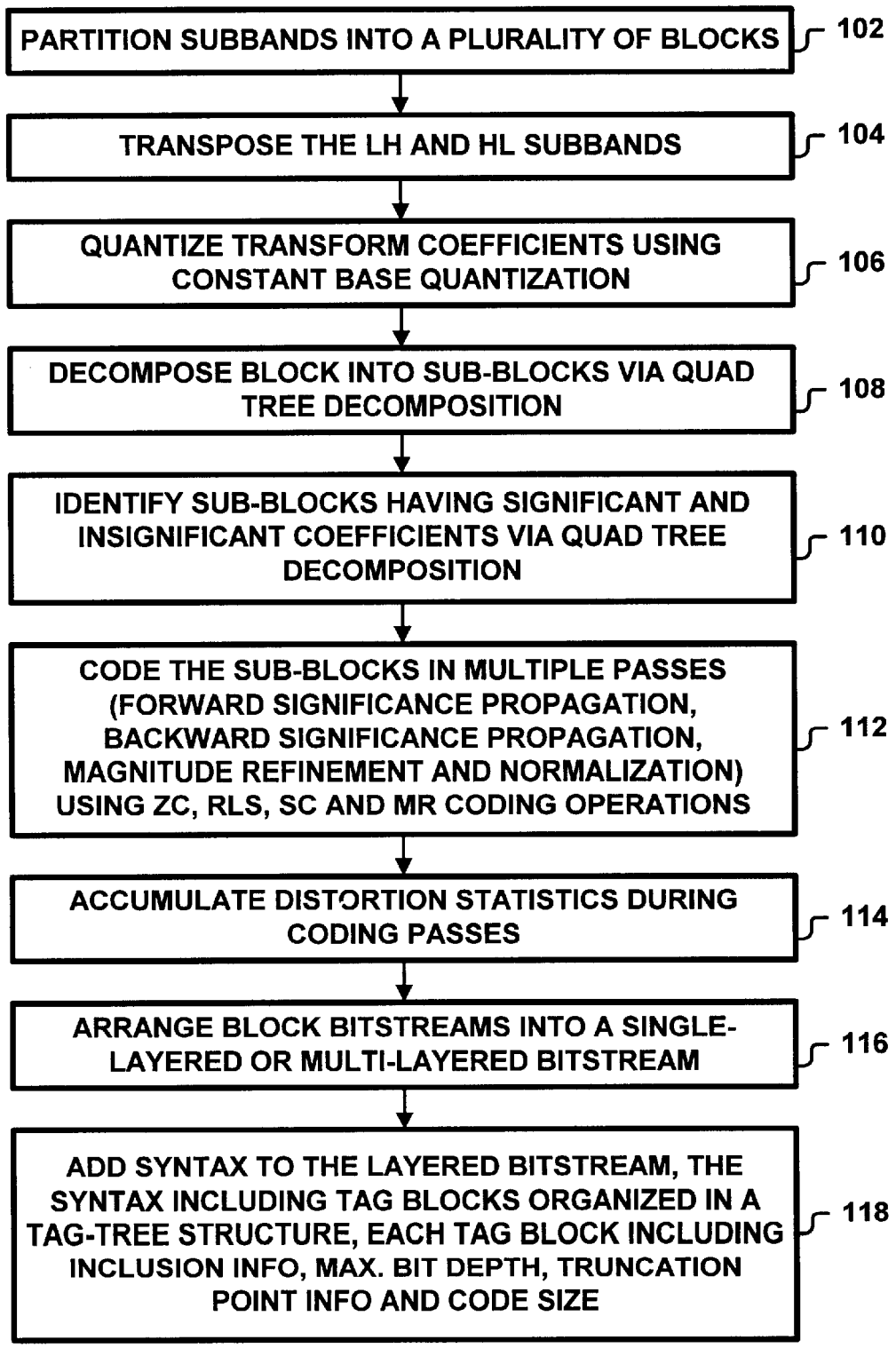
FIG. 2 is a flowchart of a method of generating a layered embedded bitstream in accordance with the present invention.

As shown in the drawings for purposes of illustration, the present invention is embodied in methods and apparatus for compressing data into embedded bitstreams and reconstructing the data from the embedded bitstreams. The embedded bitstreams are generated and processed with greater scalability, random access, error resilience and coding efficiency. Complexity is low and bit rate is controlled efficiently. The present invention supports region-of-Interest ("ROI") reconstruction, and it can be used to provide better support for client-server applications and greater flexibility for proprietary encoders to optimize the bitstream by exploiting "psycho-visual" properties.

Reference will now be made to FIG. 1. Before starting the description of the present invention, an exemplary hierarchical subband decomposition of image data will be described. A Wavelets transform may be used to perform the subband decomposition. At a first level of decomposition, image data (e.g., luminance or chrominance data of an image) is filtered by high pass and low pass filters, in both horizontal and vertical directions, and then each of the resulting bands is subsampled by a factor of two in the horizontal and vertical directions. Resulting at the first level are the following subbands: a high-pass horizontal, high-pass vertical subband; a high-pass horizontal, low-pass vertical subband; a low-pass horizontal, high-pass vertical subband; and a low-pass horizontal, low-pass vertical subband. Each subband is one-quarter the size of the original image.

Each additional decomposition is performed on the coarsest or lowest subband. Thus, a second decomposition would be performed on the low-pass horizontal, low-pass vertical subband. Three levels of decomposition are performed to produce the three-level subband decomposition shown in FIG. 1. In actual practice, the number of levels of decomposition will depend upon factors such as image size.

The coarsest frequency information may be found in the lowest frequency subband, which is located in the upper left corner (subband SB0) of the subband decomposition. The finest frequency information may be found in the highest frequency subband, which is located in lower right corner (subband SB9) of the subband decomposition.

Parent-child dependencies are shown with the arrows pointing from the subband of the parent nodes to the subbands of the child nodes. Each subband SB0 to SB9 of the subband decomposition includes an array of transform coefficients. There is also the usual parent-child relationship among Wavelet transform coefficients.

Reference is now made to FIG. 2, which illustrates a method of generating a layered embedded bitstream from a subband decomposition. In general, each subband is partitioned into a plurality of blocks (step 102); blocks of HL subbands are transposed (step 104), and the blocks of each subband are coded (steps 106 to 112). The blocks of each subband are coded independently of each other, that is, without using any information from the other blocks. The coding steps produce an individual block bitstream for each block.

While the blocks are being coded, distortion rate data is being accumulated for each block (step 114). The distortion rate data may be used later to determine candidate truncation points for each block bitstream.

After the block bitstreams have been generated, the block bitstreams are concatenated into a layered embedded bitstream (step 116) and a bitstream syntax is added (step 118). Each layer may correspond to a discrete bit rate, an image resolution or some other unit of organization.

Figures 4, 4A:
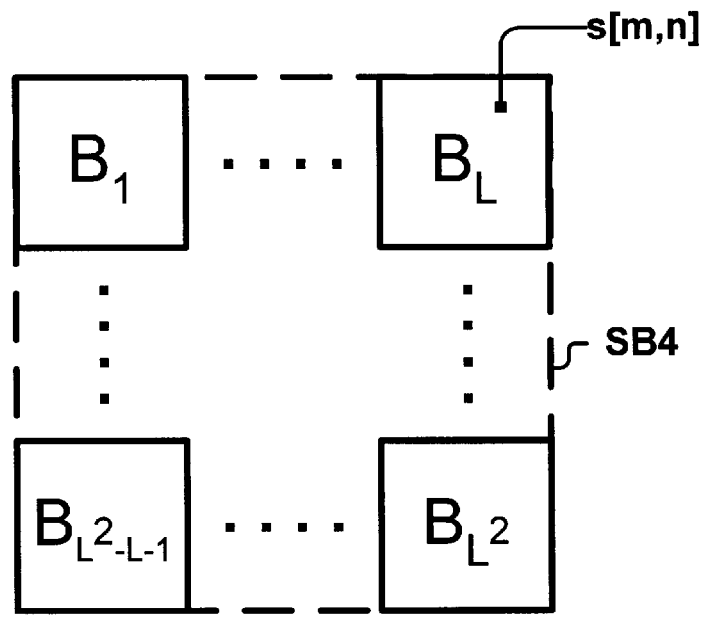
FIG. 4a is an illustration of block partitioning of a subband.
FIG. 4 is an illustration of sub-block partitioning of a subband block.

The method will now be described in greater detail. At step 102, each subband is partitioned into a plurality of blocks. All blocks within a subband have the same size (e.g., 64×64 samples, 32×32 samples, 64×16 samples, 128×8 samples, where the smaller dimension is the block height), with the possible exception of blocks lying on image boundaries (i.e. the boundaries of the array of samples from the relevant subband which represent the image). Apart from this exception, the block size is also identical for all subbands, so that blocks in lower resolution subbands span a larger region in the original image. The block partitioning may start at the top-left hand corner of the subband so that only those blocks which touch the lower and right hand image boundaries may have smaller size. An exemplary partitioning of a subband (e.g., SB4) into L×L blocks is shown in FIG. 4a. Within the block, a sample sequence s[m,n], indices m and n refer to the row and column within the block.

At step 104, blocks of HL subbands may be transposed prior to encoding. This allows the same algorithm is used for coding the blocks in each of the subbands. At any given resolution level there are up to four different types of subbands: LL, LH, HL and HH. The LL subband appears only in the lowest resolution level and contains DC sample values. The LH subband corresponds to horizontal low-pass filtering and vertical high-pass filtering; it responds most strongly to horizontally oriented edges and lines in the original image. The HL subband corresponds to vertical low-pass filtering and horizontal high-pass filtering; it responds most strongly to vertically oriented edges and lines in the original image. The HH subband corresponds to high-pass filtering in both the horizontal and vertical directions; it responds most strongly to diagonally oriented lines, but generally has much less impact on overall compression efficiency than either the LH or HL bands.

At step 106, transform coefficients of the blocks are quantized. Quantization may be performed such that a constant base quantization is used. A dead-zone quantizer having a central quantization interval twice as large as all other intervals may be employed. Moreover, neither the quantization step size nor the representation levels used during dequantization need be based upon properties of the specific image being compressed.

Let the quantization step size for the relevant subband be denoted by $\delta$. Let $X[m,n]$ denote the sign of $s[m,n]$ and let $v[m,n]$ denote the quantized magnitude, i.e.

$$v[m,n] = \text{Abs}(s[m,n])/\delta$$

where $\text{Abs}(\cdot)$ represents the absolute value operator.

The representation of $s[m,n]$ in terms of $X[m,n]$ and $v[m,n]$ is equivalent to dead-zone quantization in which the central dead-zone is twice as large as the step size $\delta$. FIG. 3 depicts the thresholds for such a dead-zone quantizer. It would be desirable to represent the quantized magnitudes $v[m,n]$ as integers with a fixed number of bits P. Both the encoding and decoding should agree on a suitable value of P.

The value P may be determined as follows. A nominal range $v_{max}$ for the quantized magnitude values is identified in the following manner. Suppose that wavelet filter taps have been normalized so that the DC gain of each low-pass filter and the Nyquist gain of each high-pass filter are both equal to unity and that the step size $\delta$ is expressed with respect to this normalization. Let $\beta$ denote the number of bits used to represent sample values in the original image (e.g., 8 bits, 12 bits). If $v_{max} = 2^{\beta-1}/\delta$, the nominal range of the quantization indices (twice the nominal range of their magnitude) is expected to be comparable to the nominal range of the input image samples, divided by the quantization step size, subject to a unit gain normalization. The magnitude values v[m,n] are represented using exactly P bits, where P is the smallest integer which satisfies $2^P \geq 4v_{max}$. The value P may turn out to be larger than the bit-depth of the words used to represent quantized sample values in any particular implementation. In this case, one or more least significant bits may be dropped from the quantized sample values either at the encoding or decoding or both. Since the coding is fundamentally bit-plane coding, this process of dropping least significant bits is entirely natural if the encoding and decoding implementations support representations with different maximum bit depths.

Let $v_p$[m,n] denote the $p^{th}$ bit in the P bit integer representation of v[m,n], where p runs from 0 to P−1 and where p=0 corresponds to the least significant bit. The idea behind bit-plane coding is to send first the most significant bits $v_{P-1}$[m,n] for all samples in the code block, then the next most significant bits and so on until all bit planes have been sent. It the bitstream is truncated then some or all of the samples in the block may be missing one or more least significant bits, which is equivalent to having used a coarser dead-zone quantizer for the relevant samples, with a step size of $\delta 2^p$, where p is the index of the last available bit-plane.

To efficiently encode $v_p$[m,n], previously encoded information about the current sample s[m,n] is exploited from previous bit-planes and neighboring samples. This may be done primarily via a binary-valued state variable σ[m,n], which is initialized to 0, but transitions to 1 when the relevant sample's first non-zero bit-plane value $v_p$[m,n] is encoded. This state variable σ[m,n] is referred to as the "significance" of sample s[m,n]. The point at which a sample becomes significant depends intimately upon the sequence in which sample values are encoded, as will be discussed below.

At steps 108 and 110, the quantized transform coefficients are ordered by decomposing the blocks into sub-blocks, and identifying the blocks and sub-blocks having significant and insignificant coefficients. This may be done by performing a multi-level quad tree decomposition on each block.

Each block, denoted by $B_i$, may be partitioned into a number of sub-blocks $B_i^j$. A typical maximum dimension for each sub-block could be sixteen samples. All sub-blocks may have the same dimension, except those at the lower and right hand boundaries of the code block, which may have smaller dimensions. Thus, a block of 64×64 samples may be partitioned into a 4×4 array of 16×16 sub-blocks, except for those blocks lying on the lower and right-hand image boundaries. For example, a boundary block which measures 36×56 could be partitioned into a 3×4 array of sub-blocks.

Sub-blocks are formed to avoid running the zero coding algorithm (described below) on large regions of zeros, since this is relatively inefficient until the adaptive arithmetic coding has had an opportunity to learn the probability with which insignificant symbols become significant in any given bit-plane. For each bit-plane, information concerning sub-blocks that contain one or more significant samples is encoded first; all other sub-blocks are by-passed in the remaining coding phases for that bit-plane.

There are a variety of ways to encode the significance of the sub-blocks, but a quad-tree coder offers a simple implementation. The use of a partial embedded quad-tree is a natural extension of the use of a single bit to represent whether or not each leading quantization layer (or bit-plane) contains any significant samples at all. It turns out to be helpful when working with independent blocks, since context information is not carried from previous blocks. Otherwise, this information would be re-learned every time.

The quad tree coding may be performed as follows. Let $\sigma_p(B_i^j)$ denote the significance of sub-block $B_i^j$ in bit-plane p. That is, $\sigma_p(B_i^j)=1$ if and only if the magnitude $v[m,n] \geq 2^p$ for some sample s[m,n], in sub-block $B_i^j$; otherwise, $\sigma_p(B_i^j)=0$. Essentially, the embedded quad-tree coding can be understood as sending a standard quad-tree code for the binary sequence $\sigma_p(B_i^j)$ except that all symbols which can be determined directly from a previous bit-plane $\sigma_{p+1}(B_i^j)$ is skipped. To specify the exact coding sequence, let $Q_i^1[j]$ denote the sequence of level-1 quads (i.e., 2×2 blocks of sub-blocks). Thus, $Q_i^1[1]$ consists of the top left 2×2 block of sub-blocks $B_i^1$, $B_i^2$, $B_i^5$ and $B_i^6$ (see FIG. 4). The quads are arranged in scan-line order as are the sub-blocks. Level-1 quads lying on the block boundaries might contain anywhere from one to four sub-blocks, depending upon the dimensions. In the same way, level-2 quads $Q_i^2[j]$ are defined to be 2×2 groupings of level-1 quads and so on. Thus, a level-2 quad tree decomposition of a 64×64 block would produce 16×16 sub-blocks. Let $\sigma_p(Q_i^1[j])$ denote the significance of the level-1 quad $Q_i^1[j]$ in bit-plane p, which is 1 if and only if at least one member sub-block is significant in bit-plane p. At each bit-plane, p, the quad-tree coder visits the level-L quad first, followed by the level-(L−1) quads and so forth down to the level-1 quads. When visiting a particular quad $Q_i^1[j]$, the quad tree coder sends the significance of each of the four (possibly less at boundaries) child quads $\sigma_p(Q_i^{l-1}[j])$, or sub-blocks $\sigma_p(B_i^j)$, as appropriate, except if the significance value can otherwise be deduced upon decoding. The significance may be deduced by a quad tree decoder if one or more of the following conditions is satisfied:

a) the relevant quad or sub-block was significant in the previous (i.e. more significant) bit-plane;

b) the entire sub-block is insignificant, i.e. $\sigma_p(Q_i^1[j])=0$; or c) this is the last child quad or sub-block visited in $Q_i^1[j]$ and all previous quads or sub-blocks are insignificant.

This quad-tree coding algorithm is incomplete unless the significance of the "root" quad, i.e., $\sigma_p(Q_i^1[1])$ is also encoded. This is essentially equivalent to encoding the bit-plane $p_i^{max}$ in which the first sample in the code block becomes significant. Either this information may be made a part of the block's own embedded bitstream, or the information can be included into the bitstream syntax.

At step 112, each block is coded bit-plane by bit-plane, with each bit-plane being coded in multiple passes. Sub-blocks containing significant coefficients with respect to a previous bit-plane are coded on all but a final pass, and sub-blocks containing significant information with respect to a current bit-plane are coded on the final pass, the significant information having been identified by the quad tree decomposition.

Figure 5:
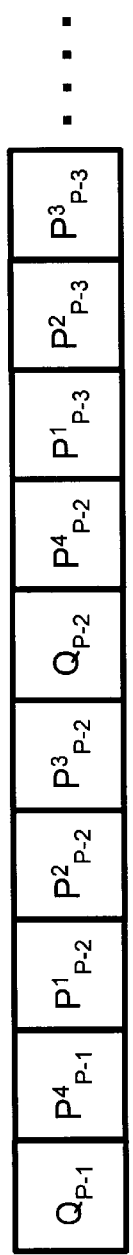
FIG. 5 is an illustration of a block bitstream.

For each bit-plane, the coding proceeds in a number of distinct passes. The number of passes may be adjusted. However, four passes will be described herein. Information encoded in each of these four different types of coding passes for bit-plane p will be denoted by $\mathcal{P}_p^1$, $\mathcal{P}_p^2$, $\mathcal{P}_p^3$ and $\mathcal{P}_p^4$. The quad-tree information encoded in bit-plane p is denoted by $Q_p$. FIG. 5 illustrates the composition and organization of an individual block bitstream using this notation.

The quad-tree code which identifies the significant blocks for bit-plane p appears immediately before the final coding pass for that bit-plane, but after the first three coding passes for that bit-plane. Within any given coding pass, all sub-blocks that have not yet been found to be significant are ignored. Consequently, a fourth coding pass $\mathcal{P}_p^4$ skips over all sub-blocks which are insignificant in the current bit-plane p, whereas the first three coding passes $\mathcal{P}_p^1$, $\mathcal{P}_p^2$ and $\mathcal{P}_p^3$ skip over all sub-blocks which are insignificant in the previous bit-plane p+1, even though some of those sub-blocks might contain significant samples in the current bit-plane p. This occurs because the quad-tree information for the current bit-plane p does not appear until after the first three coding passes $\mathcal{P}_p^1$, $\mathcal{P}_p^2$ and $\mathcal{P}_p^3$. One or more coding leading coding passes might be empty, since no sub-blocks are significant at all. These empty coding passes consume no bits, since the bit-plane $p_i^{max}$ in which each code block $B_i$ first becomes significant is identified via a separate mechanism in the bitstream syntax.

In each coding pass, the samples within each significant sub-block are coded together before moving to the next sub-block. Context information, however, is shared between the sub-blocks. Such sharing tends to reduce the complexity of both hardware and software implementations of the block coding algorithm. The idea is to visit each potentially significant sample in exactly one of the four coding passes associated with each bit-plane, p. To assist in the definition and implementation of these coding passes, it is helpful to introduce a "visited" state variable F[m,n], which is initialized to 0 at the end of the fourth coding pass $\mathcal{P}_p^4$ and is set to 1 whenever the relevant sample is visited in some coding pass.

The first coding pass $\mathcal{P}_p^1$ may be a "Forward Significance Propagation" pass; the second coding pass $\mathcal{P}_p^2$ may be a "Backward Significance Propagation" coding pass; the third coding pass $\mathcal{P}_p^3$ may be a "Magnitude Refinement" pass; and the fourth coding pass $\mathcal{P}_p^4$ may be a "Normalization" pass. During each pass, one or more of the following arithmetic coding operations may be applied: Zero Coding ("ZC"), Run-Length Coding ("RLC"); Sign Coding ("SC"); and Magnitude Refinement ("MR") These four different types of coding operations—ZC, RLC, SC and MR—are used over and over again in the bit-plane coding process. Using these operations, new information may be coded for a single sample s[m,n] for some bit-plane, p. If the sample is non yet significant (i.e. σ[m,n]=0), a combination of the Zero Coding and Run-Length Coding is used to encode whether or not the symbol is significant in the current bit-plane (i.e. whether or not $v_p$[m,n]=1). If so, the Sign Coding is also invoked to send the sign X[m,n]. If the sample is already significant (, i.e. σ[m,n]=1), the Magnitude Refinement coding is used to encode the new bit-position $v_p$[m,n]. In every case, a single binary-valued symbol is encoded, using a common arithmetic coding engine and one or another context states, determined from information available at neighboring sample locations within the same block.

During the Forward Significance Propagation pass, the sub-blocks may be visited in forward scan-line order (i.e. $B_i^2$, $B_i^2$, $B^{i3}$, ...), skipping over all sub-blocks that have not yet been found significant with respect to the previous bit-plane p+1 (as identified by the quad-tree code). Within each sub-block the samples may be visited in scan-line order, starting from the top left corner of the sub-block and finishing at the bottom right corner, skipping over all samples except those which are insignificant and have a so-called "preferred neighborhood". For blocks from the LL, LH and HL subbands, a sample s[m,n] is said to have a preferred neighborhood if at least one of its horizontal neighbors is significant (i.e. if σ[m,n−1]+σ[m,n+1]≠0). For blocks from the HH subband, a sample s[m,n] is said to have a preferred neighborhood if at least one of its diagonal neighbors is significant (i.e. σ[m−1,n−1]+σ[m−1,n+1]+σ[m+1,n−1]+σ[m+1,n+1]≠0). Any neighbor which lies beyond the code block boundaries may be interpreted as insignificant. A ZC operation is applied to each sample that is currently insignificant (i.e., σ[m,n]=0), and has the relevant preferred neighborhood, whether or not it continues to be insignificant with respect to the current bit-plane. If it becomes significant (i.e. $v_p$[m,n]=1), the SC operation is also invoked to code the sign bit. Regardless of whether the sample becomes significant or not, all samples which were not skipped during this coding pass have their visited state variable F[m,n] toggled to 1, to signal to future coding passes that all relevant information for the current bit-plane has already been coded. Thus, this pass is called the Forward Significance Propagation pass because samples which have been found to be significant serve as seeds for waves of new significance determination which propagate from left to right across the code block.

The Backward Significance Propagation coding pass is identical to the Forward Significance Propagation coding pass except in that: 1) the sub-blocks and samples thereof are visited in reverse scan-line order, starting from the bottom right corner and ending at the top left; 2) samples s[m,n] for which the visited state variable F[m,n] is set to 1 are skipped; and 3) instead of a "preferred neighborhood", any sample is considered for which at least one of the eight immediate neighbors is significant. Apart from these modifications, the operations are the same as before: any sample s[m,n] which is insignificant (i.e., σ[m,n]=0), and has the relevant neighborhood, and for which no information has yet been coded in the current bit-plane (i.e. F[m,n]=0), is processed with the ZC coding operation and, if necessary, the SC coding operation, after which F[m,n] is toggled to 1. Thus, this coding pass is called the Backward Significance Propagation pass because samples which have been found to be significant serve as seeds for waves of new significance determination which propagate from right to left and from the bottom to the top of the code block.

During the Magnitude Refinement coding pass, sub-blocks are visited in forward scan-line order, as in the Forward Significance Propagation pass, skipping over all sub-blocks which have not yet been found to be significant with respect to the previous bit-plane p+1 (as identified by the quad-tree code). Within each sub-block samples are visited in scan-line order, starting from the top left corner of the sub-block and finishing at the bottom right corner, skipping over all samples, except those which are significant (i.e. σ[m,n]=1), and for which no information has yet been coded in the current bit-plane (i.e. F[m,n]=0). These samples are processed with the MR coding operation. There is no need to explicitly modify the visited state variable F[m,n], since the fourth coding pass $\mathcal{P}_p^4$ ignores significant samples and also resets the visiting state variable F[m,n] to 0 for all samples in the code block.

During the Normalization pass, sub-blocks are visited in forward scan-line order, as in the Forward and Backward Significance Propagation pass, skipping over all sub-blocks which have not yet been found to be significant in the current bit-plane p (as identified by the quad-tree code). Within each sub-block samples are visited in scan-line order, starting from the top left corner of the sub-block and finishing at the bottom right corner, skipping over all samples, except those which are insignificant (i.e. σ[m,n]=0), and for which no information has yet been coded (i.e. F[m,n]=0). These samples are processed with a combination of the ZC and RLC coding operations and, if necessary, the SC coding operation. At the end of this coding pass all samples have their visited state variable reset to F[m,n]=0, in preparation for the first coding pass of the next bit-plane. This pass is called the Normalization pass because it brings all samples in the code block up-to-date with bit-plane, p.

The ZC, RLC, SC and MR coding operations may be performed as follows. For Zero Coding, upon entry, σ[m,n]=0. The binary symbol which is coded is $v_p[m,n]$. Ten different context states may be used to code the value of this symbol, depending upon the significance state variables of the eight immediate neighbors and six non-immediate neighbors. The relevant neighbors are illustrated in FIG. 6. These neighbors may be grouped into four categories:

(a) Immediate horizontal neighbors. The number of these neighbors that are significant is denoted by $0 \leq h \leq 2$.

(b) Immediate vertical neighbors. The number of these neighbors that are significant is denoted by $0 \leq v \leq 2$.

(c) Immediate diagonal neighbors. The number of these neighbors that are significant is denoted by $0 \leq d \leq 4$.

(d) Non-immediate neighbors. The number of these neighbors that are significant is denoted by $0 \leq f \leq 6$.

Note that neighbors which lie beyond the boundary of the code block are understood as being insignificant when forming contexts so as to avoid dependence between code blocks. No such assumptions are imposed on neighbors which lie beyond the current sub-block, however, so that sub-blocks are by no means independent and the order in which sub-blocks are visited is important. Table 1 provides a context assignment map for Zero Coding, which identifies the relationship between the ten context states and the four quantities, h, v, d and f, for each different type of subband.

TABLE I

| LL, LH and HL subbands | | | | | HH subband | | | |
|---|---|---|---|---|---|---|---|---|
| H | V | D | F | Context | D | h + v | f | Context |
| 2 | X | X | X | 9 | ≧3 | X | x | 9 |
| 1 | ≧1 | X | X | 8 | 2 | ≧1 | x | 8 |
| 1 | 0 | ≧1 | X | 7 | 2 | 0 | x | 7 |
| 1 | 0 | 0 | X | 6 | 1 | ≧2 | x | 6 |
| 0 | 2 | X | X | 5 | 1 | 1 | x | 5 |
| 0 | 1 | X | X | 4 | 1 | 0 | x | 4 |
| 0 | 0 | ≧2 | X | 3 | 0 | ≧2 | x | 3 |
| 0 | 0 | 1 | X | 2 | 0 | 1 | x | 2 |
| 0 | 0 | 0 | ≧1 | 1 | 0 | 0 | ≧1 | 1 |
| 0 | 0 | 0 | 0 | 0 | 0 | 0 | 0 | 0 |

The statistics of the HL and LH orientation subbands are expected to be very similar, since blocks from the HL subband are transposed prior to coding. In view of this transposition, the relevant edge orientations which excite either type of subband should appear to be oriented horizontally within the code blocks, which explains why these subbands have the same context assignment.

The context assignment map identified in Table 1 has been designed for efficient implementation in hardware with a relatively small number of logic gates. In software implementations, however, the context assignment maps may be implemented via two 9-bit lookup tables instead.

The Run-Lenght Coding operation is used in conjunction with the Zero Coding operation to reduce the average number of binary symbols that are encoded using the arithmetic coding engine. The RLC operation is invoked in place of the ZC operation if and only if the following conditions hold:

(a) Four consecutive samples have a zero state variable (i.e., σ[m,n]=0).

(b) All four samples are identically zero neighborhoods. That is, the ZC neighborhood context variables, h, v, d and f is 0 for each of the four consecutive samples.

(c) All four samples are horizontally adjacent and reside within the same sub-block.

(d) The group of four samples is aligned on a two-sample boundary. That is, proper groups of four samples start at the $1^{st}, 3^{rd}, 5^{th} \ldots$ sample of the relevant sub-block line.

Conditions (c) and (d) are enforced mainly to ensure efficient implementations of the symbol grouping scheme in both software and hardware. When a group of four symbols satisfying the above conditions is encountered, a single symbol is encoded to identify whether any sample in the group is becoming significant in the current bit-plane. This symbol is coded using a single arithmetic coding context state. If any of the four symbols becomes significant (i.e., $v_p[m,n]=1$), the zero-based index of the first significant sample in the group is sent as a two-bit quantity. The most significant bit is sent first, followed by the least significant bit. Both are sent uncoded, i.e. as binary symbols with a non-adapted uniform distribution. The sign for this sample is encoded subsequently, exactly as it would be if a significant sample were identified via the Zero Coding operation.

The Sign Coding operation is used at most once for each sample in the block immediately a previously insignificant symbol that is found to be significant during a Zero Coding or Run-Length Coding operation. On entry, σ[m,n]=0 and $v_p[m,n]=1$. The significance state variable is toggled to σ[m,n]=1 and the binary-valued sign bit X[m,n] is encoded with respect to one of five different context states, depending upon the sign and significance of the immediate vertical and horizontal neighbors. Specifically, two quantities, h and v, are defined by:

$$h = \text{sign}\{\sigma[m,n-1](1-2\chi[m,n-1]) + \sigma[m,n+1](1-2\chi[m,n+1])\}$$

$$v = \text{sign}\{\sigma[m-1,n](1-2\chi[m-1,n]) + \sigma[m+1,n](1-2\chi[m+1,n])\}$$

Thus, h (resp. v)=0 if both horizontal (vertical) neighbors are insignificant or both are significant but have opposite signs; otherwise, h (resp. v)=1 if one or both horizontal (vertical) neighbors are significant and positive, while h (resp. v)=−1 if one or both horizontal (vertical) neighbors are significant and negative. As for zero coding, the significance of any sample which lies outside the block boundaries is defined to be zero, i.e. insignificant.

There may be a total of nine different permutations of the h and v values. Some of these permutations, however, are redundant. In particular, unconditional bias of the sign bits is not expected, so that the conditional probabilities P(X|h, v) and P($\overline{X}$|−h, −v), should be identical. This symmetry is exploited to reduce the total number of sign coding contexts to five, with the aid of a "sign predictor" $\hat{\chi}$. The binary symbol which is encoded is $\hat{\chi} \oplus X[m,n]$, where $\oplus$ denotes the "exclusive OR" operator and the mapping from h and v to the context state index and $\hat{\chi}$ is found from Table 2.

This context map should be trivial to implement in hardware with the aid of a few gates. In software, a small lookup table may be used to efficiently compute the context state and sign predictor.

TABLE 2

| H  | v  | $\hat{\chi}$ | Context |
|----|----|----|---------|
| 1  | 1  | 0  | 4       |
| 1  | 0  | 0  | 3       |
| 1  | −1 | 0  | 2       |
| 0  | 1  | 0  | 1       |
| 0  | 0  | 0  | 0       |
| 0  | −1 | 1  | 1       |
| −1 | 1  | −1 | 2       |
| −1 | 0  | −1 | 3       |
| −1 | −1 | −1 | 4       |

Upon entry of the Magnitude Refinement operation, σ[m, n]=1. The binary symbol $v_p[m,n]$ is coded. A total of three magnitude refinement contexts may be used, depending upon the sample's neighborhood, and whether or not this is the first bit-plane in which magnitude refinement is being applied. A second state variable σ̌[m,n] identifies whether or not the Magnitude Refinement operation has already been applied to the sample in a previous bit-plane. This new state variable is initialized to zero and is set to 1 as the last step before the magnitude refinement operation is completed. The Magnitude Refinement context depends upon the value of σ̌[m,n] and also upon whether or not any of the immediate horizontal and vertical neighbors are significant. Let h and v have exactly the same definition as that described for the Zero Coding operation. Then, the context assignment map is given by Table 3.

TABLE 3

| σ̌[m, n] | h + v | Context |
|---------|-------|---------|
| 1       | X     | 2       |
| 0       | ≥1    | 1       |
| 0       | 0     | 0       |

The state variables σ[m,n]=1 and σ̌[m,n] may play a role in the hardware implementation which is described below. The state variables represent two of the five bits which must be maintained internally for each sample in the block. The other three bits are the sign bit X[m,n], the current bit position $v_p[m,n]$ and the visiting state variable F[m,n].

The rate-distortion algorithm described here is justified provided that the distortion measure adopted for the code blocks is additive. That is, the distortion D in the final reconstructed image should satisfy $$D = \sum_i D_i^{n_i}$$

where $n_i$ is a truncation point for the block $B_i$. Subject to suitable normalization, this additive property is satisfied by Mean Squared Error (MSE) and Weighted MSE (e.g. visually weighted MSE), provided that the Wavelet transform is orthogonal. Additivity also holds if the quantization errors for individual sample values are uncorrelated, regardless of whether or not the transform is orthogonal. In practice, the transform is usually only approximately orthogonal and the quantization errors are not completely uncorrelated, so even squared error metrics are only approximately additive.

The candidate truncation points representing each code block correspond to the conclusion of each coding pass. During compression, the number of bytes $R_i^n$ for representing all coded symbols up to each truncation point n, as well as the distortion $D_i^n$ incurred by truncating the bitstream at each point n, is assessed.

The rate-distortion algorithm described here is justified strictly only provided the distortion measure adopted for the code blocks is additive. That is, the distortion D in the final reconstructed image should satisfy $$D = \sum_i D_i^{n_i}$$

where $n_i$ is a truncation point for the block $B_i$. Subject to suitable normalization, this additive property is satisfied by Mean Squared Error (MSE) and Weighted MSE (e.g. visually weighted MSE), provided that the Wavelet transform is orthogonal. Additivity also holds if the quantization errors for individual sample values are uncorrelated, regardless of whether or not the transform is orthogonal. In practice, the transform is usually only approximately orthogonal and the quantization errors are not completely uncorrelated, so even squared error metrics are only approximately additive, but this is usually good enough for us.

The number of code bytes included into the bitstream is given by $$R = \sum_i R_i^{n_i}$$

The constrained optimization problem of finding the set of $n_i$ values which minimizes D subject to the constraint $R \leq R_{max}$ may be solved by the method of Lagrange multipliers. Specifically, the problem is equivalent to minimizing $$\sum_i (R_i^{n_i} + \lambda D_i^{n_i}) \qquad (1)$$

where the value of λ is adjusted until the rate yielded by the truncation points satisfies $R = R_{max}$. If the largest value of λ is found, such that the set of truncation points ni obtained by minimizing equation (1), yields a rate $R \leq R_{max}$, then no other set of truncation points will yield a smaller overall distortion and a rate which is less than or equal to R. It has been found that it is usually possible to find values of λ, such that R is very close to $R_{max}$ (almost always within 100 bytes), so that any residual sub-optimality is of little concern.

As for minimizing the expression in equation (1), there is a separate optimization problem for each individual code block. Specifically, for each block $B_i$, a truncation point $n_i$ is found which minimizes ($R_i^n + \lambda D_i^n$). A "Convex Hull" algorithm may be used to search for a set of truncation points that minimizes equation (1).

The terms $R_i^n$ may be computed as follows. The block coding algorithm is responsible for reporting the number of bytes $R_i^n$ for representing all symbols up to the end of the last coding pass included before each truncation point n. A single arithmetic code word may be used for the entire bitstream produced by any given block $B_i$. This means that the exact number of bits from the code word for representing a given leading subset of the symbols which have been coding generally depends upon the symbols that follow.

The rate-distortion algorithm depends only on the amount by which each coding pass reduces the distortion. Specifically, if $D_i^0$ denotes the distortion incurred by skipping the code block altogether (i.e. setting all samples to zero), then the distortion may be estimated by computing the differences $D_i^n - D_i^{n-1}$, for n=1,2,3, . . . This computation may be performed with the aid of two small lookup tables that do not depend upon the coding pass, bit-plane or subband involved. To see this, let $\Delta_i^2$ denote the contribution to distortion in the reconstructed image which would result from an error of exactly one step size in a single sample from code block Bi. For squared error metrics such as MSE or visually weighted MSE, this is a constant value which may readily be computed from the Wavelet filter kernel and the quantization step size in the relevant subband. If $$v'[m,n] = 2^{-P}v[m,n] - 2\left\lfloor \frac{2^{-P}v[m,n]}{2} \right\rfloor$$

then v'[m,n] holds the normalized difference between the magnitude of sample s[m,n] and the largest quantization threshold in the previous bit-plane which was not larger than the magnitude. Thus, $0 \leq v'[m,n] \leq 2$. Although the sample s[m,n] is actually a quantized integer quantity, it will be allowed that the quantizer can supply fractional bits for the sample s[m,n] and hence v[m,n], which can be used in the equation above to produce accurate estimates of the distortion associated with coding passes in the less significant bit-planes. Now when a single sample first becomes significant in a given bit-plane p, $v[m,n] \geq 2^P$ and hence $v'[m,n] \geq 1$ and the reduction in distortion may be expressed as ti $2^{2P}\Delta_i^2((v'[m,n])^2-(v'[m,n]-1.5)^2)=2^{2P}\Delta_i^2 \cdot f_s(v'[m,n])$ provided the representation levels used during inverse quantization are midway between the quantization thresholds. Also, the reduction in distortion which may be attributed to magnitude refinement of a sample in bit-plane p may be expressed as $$2^{2P}\Delta_i^2\left((v'[m,n]-1)^2-\left(v'[m,n]-\frac{1}{2}\right)^2\right)=2^{2P}\Delta_i^2 \cdot f_m(v'[m,n])$$

Thus, the reduction in distortion incurred during a single coding pass may be computed by summing the outputs of one of two different functions $f_s(\cdot)$ or $f_m(\cdot)$ as appropriate, whenever a sample becomes significant or its magnitude is refined and then scaling the result at the end of the coding pass by a constant value which may be computed from the bit-plane index and the value of $\Delta_i^2$. The argument v'[m,n] to these functions has a binary representation of the form v.xxxxx, where v, the only bit before the binary point, is simply the value of magnitude bit p, i.e. $v_p[m,n]$. For example, six extra bits beyond the binary point may be used to index a 7-bit lookup table for $f_m(\cdot)$ and a 6-bit lookup table for $f_s(\cdot)$ (recall that $1 \leq v'[m,n] < 2$ results when a sample first becomes significant). Each entry of these lookup tables holds a 16-bit fixed point representation of $2^{13}f_s(v'[m,n])$ or $2^{13}f_m(v'[m,n])$, as appropriate.

At step 116, the block bitstreams are arranged into a layered embedded bitstream. The layered bitstream may be generated by determining the extent to which each block bitstream should be truncated in order to achieve a particular target bit-rate, distortion bound or other quality metric; and composing the final compressed bitstream by stringing the blocks together in any pre-defined order, together with syntax for identifying the number of bytes that represent each block. The syntax will be described below. The bitstream syntax permits any collection of blocks to be randomly accessed and decoded. Consequently, any bitstream layer may be partially decoded, either because it is only partially received (e.g. bitstream truncation) or because limited computational capabilities upon decompression.

The representation of each block may be distributed across multiple (perhaps as many as fifty or more) layers, so that the representation embodied by layers $\lambda=1$ through A is optimal in a rate-distortion sense, for each value of $\lambda$. Each layer may correspond to a discrete bit rate. Thus constructed are bitstreams which are optimized for decompression at a single bit-rate, at a small collection of well-defined bit-rates (targeted scalability) or at any arbitrary bit-rate (generic scalability).

Generating the layered bitstream will now be illustrated by the following simple example. A subband is divided into 128 blocks. As each block is being coded, distortion statistics are being accumulated for each block. When coding has been completed, there are 128 bitstreams, each corresponding to a block.

Next, the 128 bitstreams are concatenated into a layered bitstream having three layers. The first layer corresponds to a bit rate of 0.25 bits per pixel, the second layer corresponds to a bit rate of 0.5 bits per pixel, and the third layer corresponds to a bit rate of 1.0 bits per pixel.

Three truncation points are found on each bitstream: the first truncation points corresponds to a bit rate of 0.25 bits per pixel, the second truncation point corresponds to a bit rate of 0.5 bits per pixel, and the third truncation point corresponds to a bit rate of 1.0 bits per pixel. For each bitstream, that portion starting at the first bit and ending at the first truncation point is added to the first layer, that portion starting at first truncation point and ending at the second truncation point is added to the second layer, and that portion starting at the second truncation point and ending at the third truncation point is added to the third layer. That portion of the bitstream following the third truncation point is discarded.

In the alternative, the layers may correspond to different levels of image resolution. Thus, the individual bitstreams would be ordered according to image resolution. Every bitstream layer is inherently scalable with respect to resolution and number of image components (i.e. color), because it is composed of a separate components for each resolution level l=1,2, . . . , L and each image component. Resolution level l=1 corresponds to the lowest resolution level in the Wavelet transform: it contains the LL band, in addition to the usual LH, HL and HH bands.

At step 118, a rich bitstream syntax is added to the layered bitstream. The syntax specifies one or more profile features that may be supported by the layered bitstream. The profile features may include the following:

RANDOM_ACCESS—for independently decoding a subset of the bitstream in order to reconstruct smaller regions of the image;

SNR_PROGRESSIVE—for decoding only the first N bytes of the bitstream, where N is a user specified value over which the algorithm has no control;

SNR_PARSABLE—for parsing the bitstream in order to extract an N byte subset, where N is a user specified value over which the algorithm has no control (the subset need not be simply the initial N bytes of the bitstream);

RESOLUTION_PROGRESSIVE—for organizing the bitstream so as to include all information relevant to lower resolution levels before information from higher resolution levels, so that truncation of the bitstream corresponds to reduction in the resolution of the reconstructed image;

RESOLUTION_PARSABLE—for parsing the bitstream in order to extract a subset which represents a lower resolution image, for each of the resolution levels offered by the wavelet transform; and COMPONENT_PARSABLE—for parsing the bitstream in order to extract a subset which contains a smaller number of components (e.g., color components, alpha channels, any arbitrarily defined and dimensioned image component).

Various combinations of these features may demand rich functionality from the layered bitstream. A prime example of this is the combination of the RANDOM_ACCESS and SNR_PROGRESSIVE profile features, since the random access feature indicates the possibility of extracting the code words belonging to individual blocks, without decoding the other blocks, while the SNR_PROGRESSIVE feature indicates that the information associated with these blocks is distributed throughout the layered bitstream so as to ensure the smallest possible distortion, no matter where the layered bitstream is truncated. In this case, then, the bitstream syntax can identify the size and nature of incremental contributions from individual code blocks.

The bitstream syntax may include a common header, after which each coding algorithm is free to structure the remainder of the bitstream in any desired manner, so long as the resulting organization is able to satisfy the requested set of feature profiles. The common header may include the following tags: a tag indicating the total number of bytes in the header; a tag identifying the number of resolution levels in the Wavelet transform that was originally used to compress the image; a tag identifying the number of resolution levels for which information is available in the bitstream, which may be smaller than the original number of resolution levels if the bitstream has been scaled to a lower image resolution (the same number of resolution levels may be used for each image component, when compressing color or other multi-component imagery, regardless of variations in the dimensions of the different components); a tag identifying the filter set used (e.g., Daubechies 9/7 filters); a tag identifying the feature profile or profiles supported by the bitstream; a tag identifying the maximum number of bit-planes that were able to be represented in the representation of quantized subband samples; and a tag identifying the number of image components (e.g., monochrome images, color and other multi-component image sources).

The following additional tags may be provided for each component: tags identifying the number of rows and columns in the DC subband or the relevant image component; tags identifying whether the image component decomposed by each successively higher resolution level had even or odd height and even or odd width; and a tag identifying the base quantization step size for the relevant image component.

Following the common header, the embedded block coding algorithm may insert a few tags identifying the block and sub-block dimensions, as well as the number of bitstream layers which can be expected to appear (unless the file turns out to be truncated).

Each layer component $C_\lambda^{l,c}$ commences with a "tag block", which is followed immediately by the code bytes associated with every code block represented by the layer component. The tag block identifies the code blocks from each subband in the relevant resolution level which are included in the layer component. It also identifies the truncation points for each included code block, from which the decoder can determine the set of coding passes for which information is available. Other information represented by the tag block includes the number of code bytes which are being sent for each included code block and the maximum bit-depth $p_i^{max}$ for each code block which is being included for the first time (i.e. each block which was not included in any previous bitstream layer).

Figure 7:
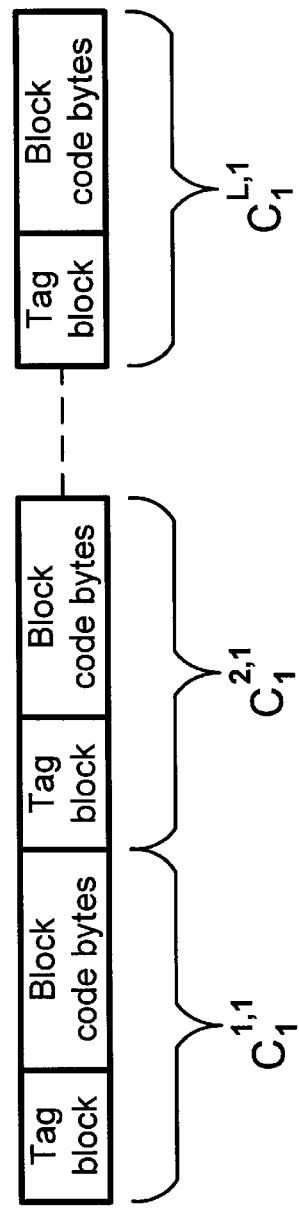
FIG. 7 is an illustration of a single-layer bitstream.

Consider a layered bitstream having only a single layer, which represents a monochrome image (i.e. only one image component, c=1). In this case, the layer components appear in order of increasing resolution, as illustrated in FIG. 7. Such a bitstream possesses the RANDOM_ACCESS, RESOLUTION_PARSABLE and RESOLUTION_PROGRESSIVE features. In fact, all bitstreams constructed using the layered component syntax possess the RANDOM_ACCESS and RESOLUTION_PARSABLE features, at a minimum.

For color and other multi-component image sources, a separate layer component appears for each image component, within any given resolution level. The layer components associated with the different image (color) components appear together in each resolution level, in order of increasing component number. Thus, a typical color image has three image components and $C_\lambda^{l,1}$, $C_\lambda^{l,2}$ and $C_\lambda^{l,3}$ that all appear together, for each l and λ. Because separate layer components are maintained for each image component, all bitstreams necessarily satisfy the requirements of the COMPONENT_PARSABLE profile feature.

In the examples that follow, only single component image sources are considered for simplicity, with the understanding that the bitstream organizations for multi-component sources may be derived from those for monochrome sources by following this simple rule.

If some form of SNR scalability is requested, i.e. either the SNR_PROGRESSIVE or the SNR_PARSABLE feature flags, multiple bitstream layers may be provided. For some applications, only limited SNR scalability is requested in the sense that it might be desirable to truncate the bitstream to one of a number of well-defined bit-rates, but nothing else. In this case, a separate bitstream layer can be set aside for each distinct target bit-rate and the contents of that layer may be optimized by using the rate-distortion optimization algorithm outlined above.

Figure 9:
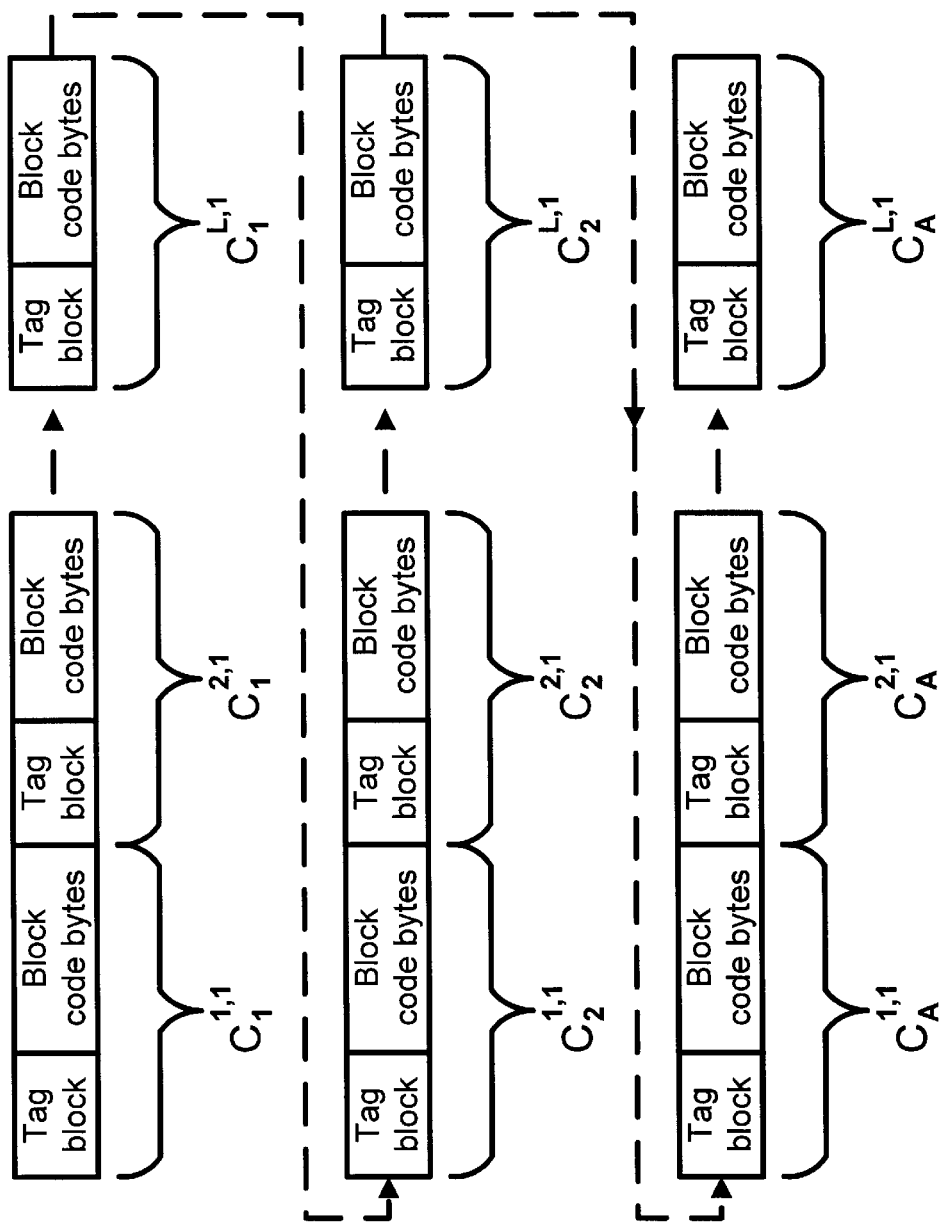
FIG. 9 is an illustration of a second type of multi-layer bitstream.

In other cases, if a large number of layers is requested so that, given any arbitrary bit-rate target, it is always possible to find one layer λ such that this layer and all preceding layers represent a rate-distortion optimized subset of the bitstream which is close to, but no larger than the target rate. The remainder of the bit rate can then be made up by including as many components as possible from the next layer, starting from the lower resolution components; a truncated component can be included to generate a final scaled bitstream which satisfies the target bit-rate as closely as possible. Two different organizations are now described. The first organization, illustrated in FIG. 8, is suitable for generating bitstreams with the RESOLUTION_PROGRESSIVE feature; of course, such a bitstream is also SNR scalable. The second organization, illustrated in FIG. 9, is suitable for generating bitstreams with the SNR_PROGRESSIVE feature.

The block tags are structured according to a "tag tree" structure. The tag tree is a particular type of tree structure which provides the framework for efficiently representing tag block information which exhibits significant redundancy between the different blocks of a subband and between different bitstream layers. The same tag tree structure will be used for representing different types of information within tag blocks, so the following will describe tag trees in a general setting.

Two differences between tag trees and conventional quad-tree coding schemes are as follows. First, the values associated with each node need not be binary-valued. Secondly, the information in a tag tree may be coded in any order. In particular, the coding process for a tag tree is driven from the leaves rather than the root. The idea is that information for the different leaves in the tree might be accessed in an arbitrary sequence. Specifically, in any given bitstream layer, the tree structure might be used to encode the values associated with a small subset of the leaf nodes (which corresponds to code blocks). In a later bitstream layer, the values associated with additional leaf nodes (code blocks) might be coded. Despite this arbitrary ordering, inter-block redundancy should be exploited as efficiently as possible, without resorting to more complex techniques such as conditional entropy coding.

Let $q_1[m,n]$ denote a two-dimensional array of quantities to be represented via the tag tree. These quantities are associated with the leaf nodes of the tree (there will be one node for each code block in a given subband) so that the two-dimensional array $q_1[m,n]$ corresponds to the array of code blocks which partition the relevant subband. The values themselves are all non-negative integers. Let $q_2[m,n]$ denote the nodes at the next level of the quad-tree structure. Each of these nodes is associated with a 2×2 block of leaf nodes, except at the boundaries of the original array. Continuing in this fashion, smaller and smaller arrays $q_3[m,n]$, $q_4[m,n]$, ..., are defined at higher levels in the tag tree until a root level is reached, which consists of a single node $q_K[m,n]$. The quantity associated with each non-leaf node is the minimum of all descendant nodes, i.e.

$$q_k[m,n]=\min\{q_{k-1}[2m,2n], q_{k-1}[2m,2n+1], q_{k-1}[2m+1,2n], q_{k-1}[2m+1,2n+1]\} \text{ for } k>1$$

where it is understood that any references to nodes which lie beyond the extent of the relevant two-dimensional array are to be ignored when taking the minimum. The organization of a four-level tag tree built from a 3×6 array of leaf nodes is illustrated in FIG. 10.

Each node in the tag tree maintains a separate state variable, which shall be denoted $t_k[m,n]$, whose interpretation is that sufficient information has already been encoded to identify whether or not $q_k[m,n] \geq t_k[m,n]$. This state variable is initialized to zero for all nodes, before any information is coded. As mentioned, the tag tree coding algorithm is driven from the leaves. The algorithm may be summed up as a procedure T[m,n,t], where m and n identify the row and column indices of the leaf node for which information is requested and t identifies a threshold. The procedure sends the sufficient information to identify whether or not $q_1[m,n] \geq t$. Specifically, the algorithm invoked by this procedure is as follows:

(i) Set k=K (i.e., start at the root node).
(ii) Set $t_{min}=t_k[0,0]$ (this initial condition has no influence on the algorithm at first until it is modified in step v below).
(iii) Set m'=

$$m' = \left\lfloor \frac{m}{2^{k-1}} \right\rfloor$$

and $P_p^1$ so that [m'n'] is the location of the relevant leaf node's ancestor in level k.

(iv) If $t_k[m',n']<t_{min}$, then set $t_k[m',n']=t_{min}$.
(v) If $t \leq t_k[m',n']$ then
  A) if k=1, the algorithm is finished.
  B) otherwise, let $t_{min}=\min\{t_k[m',n'], q_k[m',n']\}$ (so sufficient information has been sent to deduce that all descendant nodes have quantities which are at least as large as $t_{min}$) and go to step iii.
(vi) If $t>t_k[m',n']$ then (A) If $q_k[m',n']>t_k[m',n']$, emit a '0' bit;
(B) else if $q_k[m',n']=t_k[m',n']$, emit a '1' bit;
(C) set $t_k[m',n']=t_k[m',n']+1$; and
(D) go to step v.

This algorithm may be summarized as follows: start at the root node sending the minimal amount of information to identify whether or not $q_k[0,0]>t$, if this fact is not already known; then move down the tree toward the leaf node of interest, updating the node to reflect any information which can be deduced from what is known about the parent (i.e. the value must be no smaller than $t_{min}$) and repeating the process for that node. It can and frequently does happen that this procedure sends no bits at all, which is expected if the tag tree is indeed able to exploit redundancy between leaf nodes. This procedure T[m,n,t] may be invoked many times in constructing the tag block for any particular bitstream layer component.

It is possible to incrementally update the quantities represented by a tag tree after the tree has already been used to code some information. Specifically, it is possible to change the quantity $q_1[m,n]$ associated with some leaf node, provided that both new and old quantities associated with this node are both greater than or equal to the largest threshold, t, which has yet been supplied to the coding procedure T[m,n,t] for any node.

The organization of each bitstream layer component will now be described. The layer component $C_\lambda^{l,c}$ represents new information from the code blocks of the subbands in resolution level l, from image component c, which is introduced in bitstream layer λ. The component commences with a tag block, which includes a sequence of code bits identifying which code blocks are included from each subband, along with additional information concerning the maximum bit-depth, truncation point, and number of code bytes being sent for each included code block.

The tag block is followed immediately by the relevant code bytes for each of the code blocks being included. The code bytes for the LL, HL, LH and HH subbands appear in that order, with the blocks of each subband appearing in scan-line order.

The first bit in a tag block is reserved to enable bitstream parsers to discard layer components from an existing bitstream with a minimum overhead.

The remainder of the tag block is divided into separate sections corresponding to the LL band (only for resolution level 1), the HL band, the LH band and the HH band, in that order. Each section is further divided into two passes. In the first pass all blocks are scanned through in the relevant subband in scan-line order sending information to identify: 1) whether or not the code block is included in bitstream layer λ; 2) the maximum bit-depth for any code block which is being included in the bitstream for the first time; and 3) the new truncation point for the code block's embedded bitstream. In the second pass, all blocks are scanned through again in the subband in scan-line order, sending information to identify the number of code bytes which will be sent for each code block which is being included.

Inclusion Information is generated as follows. A separate tag tree is utilized for each subband to, efficiently represent the bitstream layer in which a code block is included for the first time. The leaf nodes of the tag tree correspond to the code blocks in the subband and the quantities $q_1[m,n]$ associated with each of these leaf nodes represent the index of the bitstream layer in which the code block is first included, minus 1, i.e. $q_1[m,n]=\lambda[m,n]-1$. The bitstream layer indices run from 1 to A so that code blocks which are included in the first bitstream layer will be assigned the minimum leaf quantity of 0.

For any given code block, the Inclusion Information is represented in one of two different ways, depending upon whether or not the block has been included in a previous bitstream layer. If the block has already been included in a previous layer (i.e. $\lambda[m,n]<\lambda$), a single bit is sent to identify whether or not any new information for the code block is included in the current layer. If the bitstream has not yet been included in any previous bitstream layer, the tag tree coding procedure $T[m,n,\lambda]$ is invoked. This operation emits any bits required to identify whether or not $q_1[m,n] \geq \lambda$ (i.e. whether or not $\lambda[m,n] > \lambda$).

The quantities associated with nodes in a tag tree can be exploited once coding has begun, provided the update satisfies the conditions outlined above in connection with tag-tree structures. Consequently the value of $\lambda[m,n]$ for all code blocks in the subband does not have to be determined ahead of time. Instead, the values stored at each node are initialized to infinity (or a suitably large integer), before generating any layer components. Then the bitstream layers $\lambda$ are passed through, one at a time. Before generating a tag block, it is determined whether or not each code block should be included in the layer and for each such code block. Then the relevant leaf quantity is simply set to $q_1[m,n]=\lambda[m,n]-1$. Once this has been done for all code blocks in the layer, the relevant tag block can be generated.

For each code block $B_i$ that is included in the bitstream for the first time (i.e. it has not been included in any previous bitstream layer), the Maximum-Bit Depth Information identifies the most significant bit-plane $p^{max}[m,n]$ with respect to which any sample in the code block is significant. The code block is identified by its row and column index within the subband. The maximum value which can be assumed by $p^{max}[m,n]$ is $P-1$, where $P$ is the number of bits used to represent the relevant quantized magnitudes. A second tag tree is utilized to efficiently represent $p^{max}[m,n]$ via the number of missing most significant bit-planes (i.e. $P-1-p^{max}[m,n]$). The leaf nodes of the tag tree correspond to the code blocks in the subband and the quantities $q_1[m,n]$ associated with each of these leaf nodes are set to $q_1[m,n]=P-1-p^{max}[m,n]$. To send the relevant information, the tag tree coding procedure $T[m,n,t]$ is invoked repeatedly for $t=1,2,\ldots$, until $t<q_1[m,n]$.

For every code block $B_i$ which is to be included in the bitstream, the Truncation Point Information identifies the new truncation point which applies to the code block's bitstream. Let $n_i^{min}$ denote the minimum value which this new truncation point can take on. If the code block has already been included in a previous bitstream layer $n_i^{min}$ is simply one more than the previous truncation point. If this is the first time the code block is being included in the bitstream, $n_i^{min}$ might simply be 1, i.e. the first non-trivial truncation point. In many cases, however, it will be larger, because the maximum bit-depth $p_i^{max}$ induces a minimum truncation point. To understand this, recall that the first truncation point is placed immediately after the fourth coding pass $\mathcal{P}_{P-1}^4$, where P is the number of bits used to represent the quantized magnitude values. However, the first non-empty coding pass is $\mathcal{P}_{P_i^{max}}^4$. It follows that for code blocks which are being included in the bitstream for the first time, the minimum truncation point is given by $$n_i^{min}=1+4((P-1)-P_i^{max})$$

For each code block which is to be included in the bitstream, the difference between the new truncation point and its minimum value (i.e. $n_i-n_i^{min}$) is identified, which lies in the range $0 \leq n_i-n_i^{min} < 4(P-1)$. This difference is sent by means of the following simple variable length code:

(A) If $n_i-n_i^{min}=0$, a single '0' bit is sent.
(B) If $n_i-n_i^{min}=1$, a '1' bit, followed by a "0" bit is sent.
(C) If $2 \leq n_i-n_i^{min} \leq 4$, two '1' bits, followed by a two-bit representation of $n_i-n_i^{min}-2$ is sent, starting with the most significant bit.
(D) If $5 \leq n_i-n_i^{min} \leq 35$, four '1' bits, followed by a five-bit representation of $n_i-n_i^{min}-5$ is sent, starting with the most significant bit.
(E) If $n_i-n_i^{min} \geq 36$, nine '1' bits, followed by a seven-bit representation of $n_i-n_i^{min}-36$ is sent, starting with the most significant bit.

This allows for $n_i-n_{imin}$ values up to a maximum of 163, which is sufficient for implementations involving as many as $P=41$ bit-planes.

Code size information identifies the number of bytes that are being sent for each code block included in the layer component. This information is sent in the second pass of the tag block section associated with the relevant subband, as explained above. The number of bytes that are sent for block $B_i$ is $\Delta R_i = R_i^{n_i} - R_i^{n_i\min-1}$, where $n_i^{min}$ is defined above and $n_i-n_i^{min}+1$ is the number of new coding passes for which information is being included. The number of bits used to represent $\Delta R_i$ is $\beta_i = \beta_\lambda + \lfloor \log_2(n_i-n_i^{min}+1) \rfloor$, where $\beta_\lambda$ is determined at the beginning of the pass so as to be large enough to represent the $\Delta R_i$ values for all code blocks from the subband which are included in the layer. The $\beta_i$ bit word representing $\Delta R_i$ is inserted into the tag block with the most significant bit of the word appearing first.

The value of $\beta_\lambda$ is identified at the beginning of the pass, before sending the $\Delta R_i$ values, using a comma code, whose interpretation is now explained. Before any bitstream layers are sent, each subband is assigned an initial value of $\beta_0=3$. If no code blocks are included from the subband in bitstream layer $\lambda$, no additional information is sent and $\beta_\lambda$ is set to $\beta_\lambda=\beta_{\lambda-1}$. Otherwise, a comma code consisting of $\beta_\lambda-\beta_{\lambda-1}$ '1' bits is sent, followed by a single '0' bit.

Figure 11:
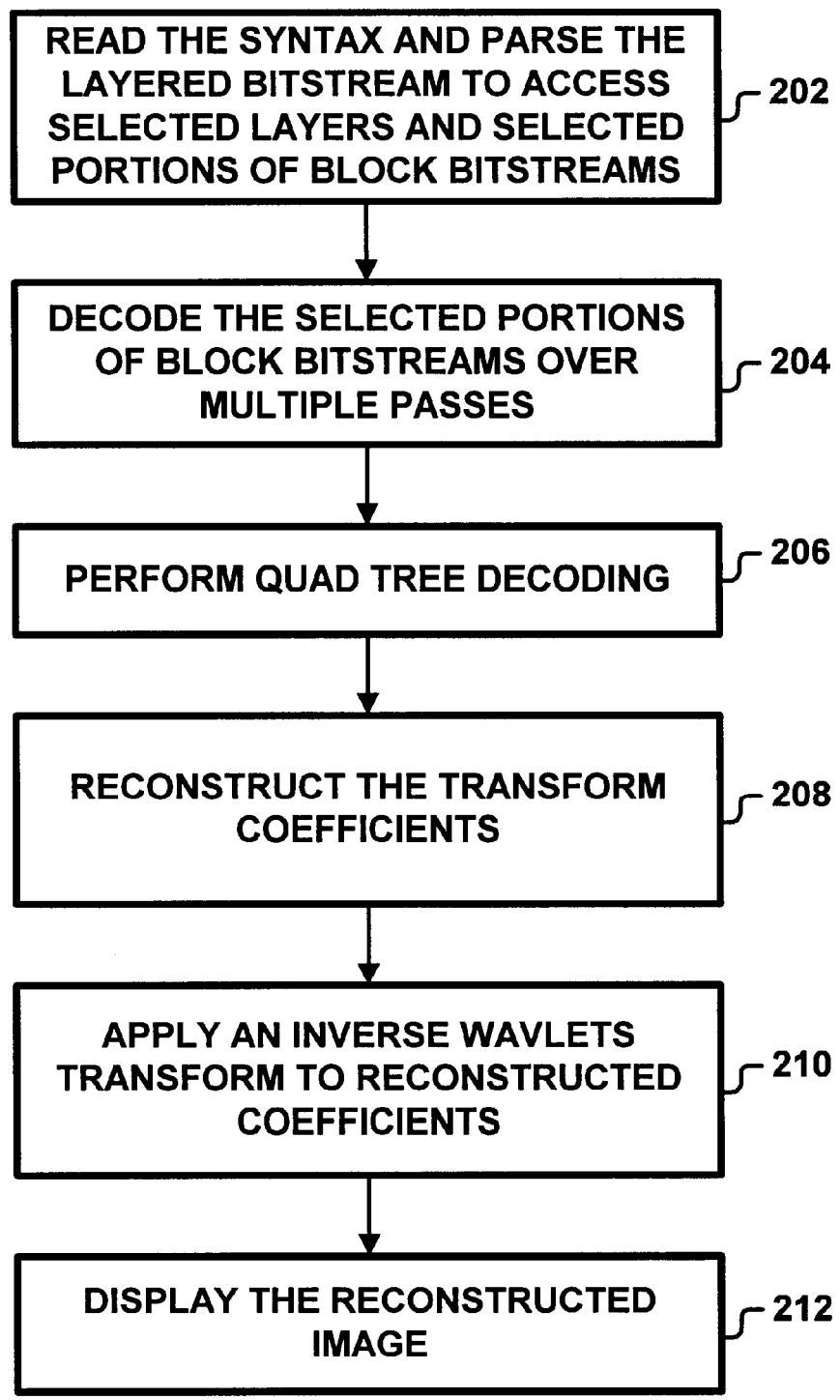
FIG. 11 is a flowchart of a method of reconstructing an image from the layered embedded bitstream.

Reference is now made to FIG. 11. Compression and decompression are highly symmetric. Therefore, decompression or image reconstruction can be performed essentially by reversing the steps used for compression. To reconstruct an image from an embedded bitstream, the syntax is read and the layered bitstream is parsed to access selected layers and selected portions of block bitstreams (step 202). Thus, portions of block bitstreams corresponding to desired bit rates, desired resolutions, and desired regions of an image can be accessed randomly. A desired bit rate can be obtained, for example, by concatenating portions of block bitstreams over successive layers.

Those portions of the block bitstreams that have been accessed from the layered bitstream are then decoded over multiple passes (block 204). Essentially, the multi-pass coding operations are reversed to produce quantized transform coefficients.

Quad tree decoding is then performed on the quantized transform coefficients (block 206). Here too, the quad tree coding operations are reversed.

Transform coefficients are then reconstructed from the quantized transform coefficients (block 208). The middle of each uncertainty interval may be used as the reconstruction values.

An inverse transform is applied to the reconstructed transform coefficients (block 210). Resulting is a reconstructed image, which may be displayed via a display device such as a video monitor or a printer (block 212).

Figure 12:
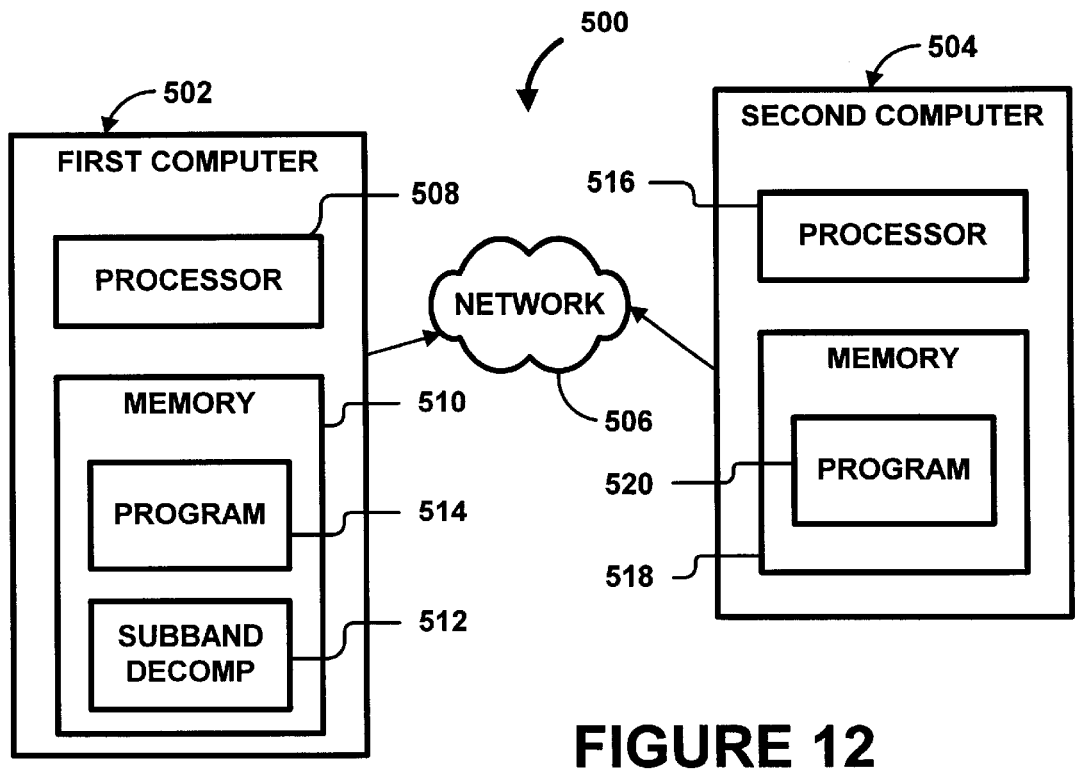
FIG. 12 is a block diagram of a system for generating a layered embedded bitstream and reconstructing an image from the layered bitstream.
Figure 13:
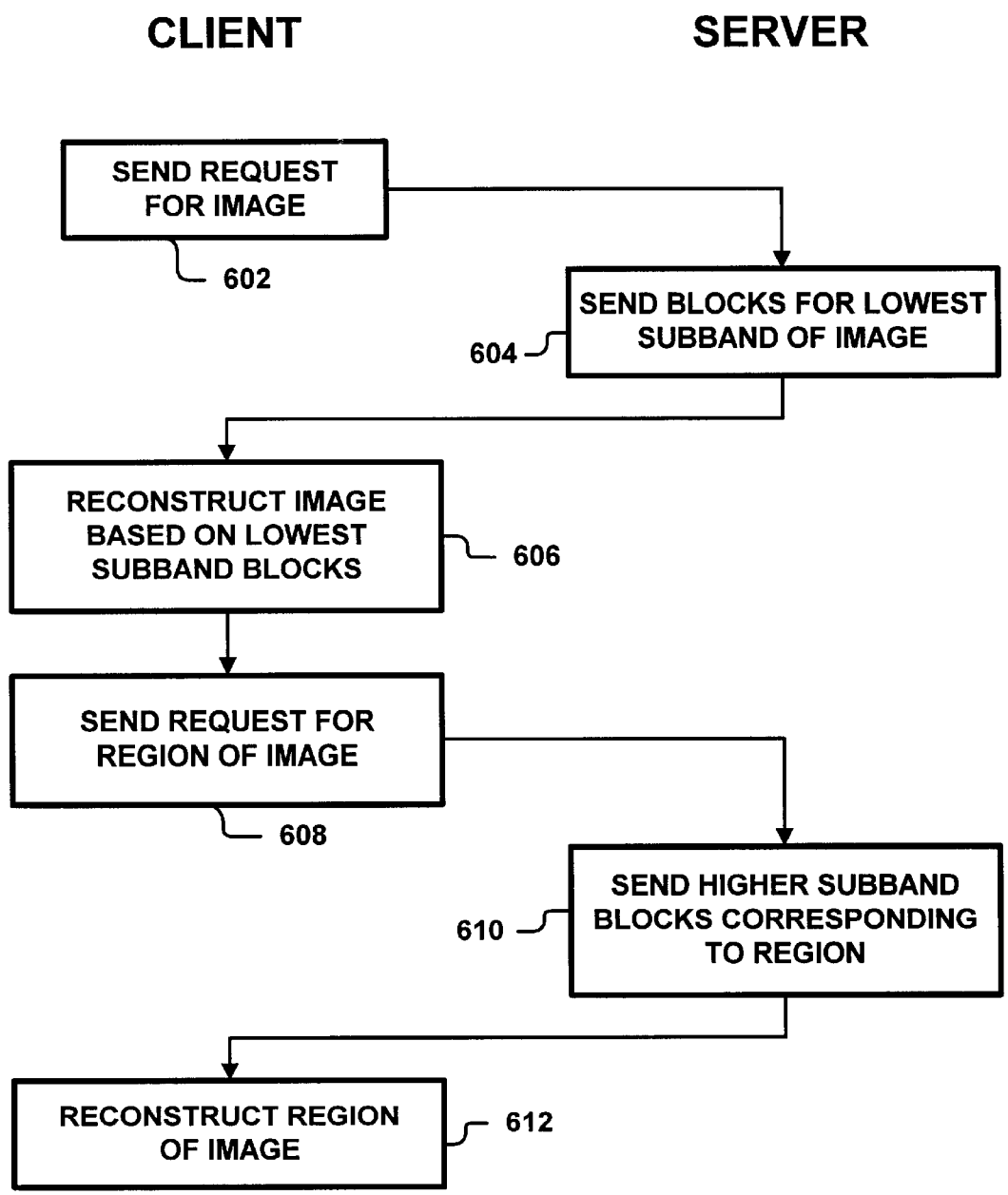
FIG. 13 is a flowchart of an exemplary transaction performed by the system of FIG. 12.

Reference is now made to FIGS. 12 and 13, which illustrate a system and method for performing region-of-interest reconstruction. FIG. 12 shows a system 500 including a server 502 and a client 504 that communicate over a network 506. The network 506 could be anything from a local area network to the Internet.

The server 502 includes a processor 508 and memory 510. Stored in server memory 510 is a subband decomposition 512 of an image. The subband decomposition 512 includes a low resolution subband and a plurality of higher resolution subbands. Each subband is coded as a plurality of blocks, with each block representing a region of the image. Different resolutions of the regions are represented in different subband blocks.

The server memory 510 is further encoded with a program 514 that instructs the server processor 508 to place the low resolution subband on the network 506 in response to a network request for the image. The server program 514 further instructs the server processor 508 to place at least one additional block on the network 506 in response to a network request for a region of the image. The additional block or blocks provide a higher resolution of the requested region.

The client 504 includes a second processor 516 and memory 518 for storing a program 520. The client program 520 instructs the client processor 516 to send network requests for images and regions of the image. The network requests may be generated interactively by a user.

The client program 520 further instructs the client processor 516 to receive blocks sent by the server 502 in response to the network requests, and reconstruct an image and region-of-interest from the blocks received on the network 506.

FIG. 12 shows a client 504 that reconstructs images entirely via software. In the alternative, the client 504 may include a chip and off-chip memory for reconstructing the image and regions of interest.

FIG. 13 shows an exemplary transaction between the server 502 and the client 504 in which the client 504 requests information about a region of a country. Running on the client 504 is a program such a web browser. A user enters a URL of a map of the country, and the client 504 places a request for the map on the network 506 (block 602).

The server 502, which stores a subband decomposition of the map, receives the network request, accesses blocks in a low subband of the decomposition, and sends all of the low subband blocks to the client 504 (block 604).

The client 504 receives the blocks and reconstructs a low resolution image of the entire map (block 606). The low resolution map is displayed to the user. Using an input device such as a mouse, the user clicks on a region of the map, and the client generates a request for the region of interest. The request is sent to the server 502 (block 608).

The server 502 receives the request and accesses blocks corresponding to the region-of-interest. The blocks are taken across different subbands. The server 502 sends these higher subband blocks to the client 504 (block 610).

The client 504 receives the blocks and reconstructs the region-of-interest (block 612). The region-of-interest is displayed to the user. The resolution of the reconstructed region (that is, the detail of the region of interest) depends upon the subbands that are accessed by the server 502.

This client-server application can involve a large compressed image that resides on a remotely located server and that is accessed and reconstructed interactively by an individual client interested in a smaller region of the image. The server only sends those higher resolution code blocks that are relevant to the region of interest. The region of support of the subband synthesis filters should be taken into account in determining the set of subband samples which are covered by the blocks that are sent to the client.

Blocks at lower resolution levels may span a substantial portion of the image so that more information is transmitted than the client has actually been requested. This is done to ensure that the region of interest is correctly reconstructed. In most region of interest decoding applications, however, an interactive user will be able to pan across a larger region of the image over time, so that the amount of new information which is transmitted during such operations will be roughly commensurate with the size of the region which is ultimately covered, provided that previously received code blocks are properly cached and reused.

Each block of each subband can be transmitted progressively so that available network bandwidth can be utilized to progressively improve the quality of a region of interest. This will depend upon the amount of time the interactive user spends on that region before panning to a new region of interest. This is a particularly attractive feature for interactive browsing of large images over the internet where most consumers have very low bandwidth links and limited patience.

Another client-server application of block coding involves selectively refining regions of a large image based on an accumulated history of client requests (the server 502 could perform this step at block 610 of FIG. 13). In the event that the whole image or a large portion of the image is requested, more rate can be allocated to the blocks corresponding to those regions of the image most often requested in the past, with the hope that the interactive user is primarily interested in these regions. The regions of interest will thus have been transmitted at a higher quality level in anticipation of the client's preference. Additionally, if storage space on the server becomes tight, and more data must be accommodated, the bitstreams corresponding to less frequently requested blocks of images can be truncated to free up space.

In addition to providing region-of-interest decoding, the system 500 can provide "degree-of-interest" decoding. Depending upon requirements of the client 504, the server 502 might send some blocks with greater fidelity than others; in an interactive setting, the server 502 might continually send higher fidelity updates for the current region-of-interest until the user moves to a different region of interest. Included in the concept of "degree-of-interest" is resolution-of-interest. File formats such as "FlashPix" and the XIFF standard support resolution-of-interest by maintaining independent tiled versions of the same image at a variety of different resolutions. The multi-resolution property of the Wavelet transform may be exploited to eliminate these multiple copies of the same image; however, the amount of distortion which can be tolerated in any given subband depends strongly upon the resolution of the image it will be used to reconstruct. Consequently, to achieve resolution-of-interest access with a single compressed image, an embedded representation of each subband is provided.

FIG. 12 illustrates a software implementation of the compression and decompression. That is, the compression and decompression are performed by general purpose computers, which are programmed to compress an image into the embedded bitstream and reconstruct the image from the embedded bitstream.

Figure 14:
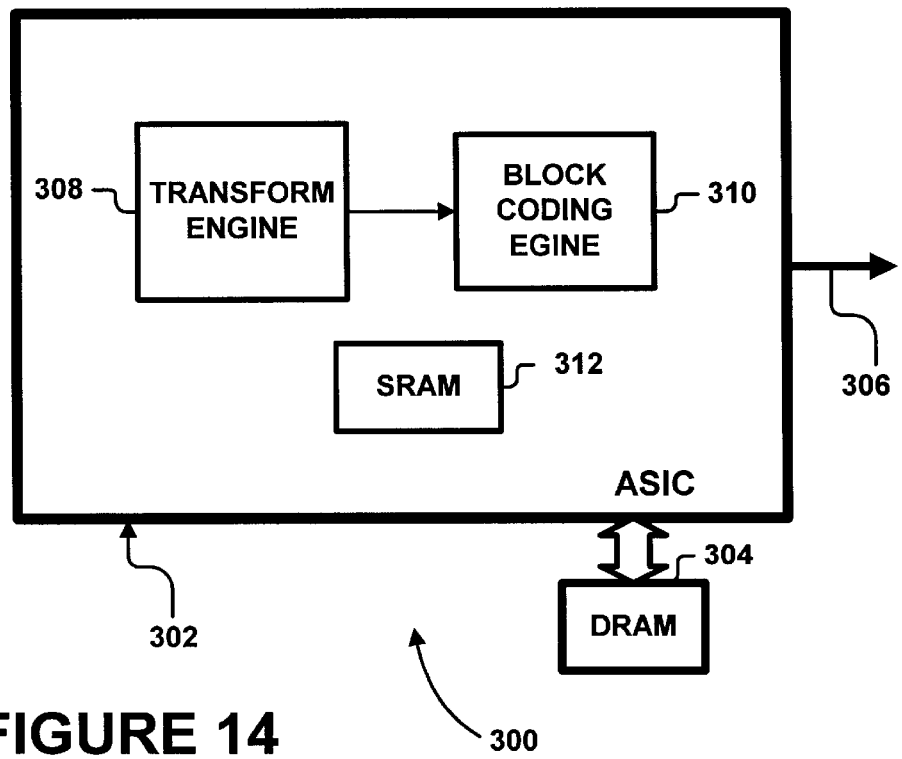
FIG. 14 is an illustration of an apparatus in accordance with the present invention.

FIG. 14 illustrates a basic hardware implementation of a compression system 30. The compression system 300 includes an ASIC 302 or some other physically distinct device and an external memory store 304 (e.g., DRAM). There is also a destination or source for the layered bitstream 306 or its constituent code words.

The ASIC 302 includes a transform engine 308 which can carry out one level of the Wavelet decomposition, taking in image samples from an external memory store and producing subband samples for each of the LL, LH, HL and HH subbands. To implement the full Wavelet decomposition, the transform engine 308 writes the LL subband samples back out to the external memory store 304, so that the same transform engine 308 can later be applied to these LL subband samples to generate another level in the decomposition. To limit the working memory required by the compression system 300, a generalized line-based transform may be implemented: instead of waiting until the entire image has been passed through the first level of decomposition before exercising the transform engine 308 to generate another level, the transform engine 308 scans across the image from left to right, reading in 2K+7 lines of the image and generating K lines of each subband, after which the 2K+7 line input window is advanced by 2K lines and the process is repeated. The region of support for these K lines of each subband, is confined to 2K+7 input lines, since a 9/7 Debauchies Wavelet transform uses filters having nine and seven taps for the low and high pass subbands, respectively. Once 2K new lines have been generated for the LL band, the transform engine is applied to that band to generate K lines from each subband in the next resolution level, and so on. In this way, the external memory store is responsible for maintaining a window of 2K+7 lines in the original image and at each intermediate resolution level in the Wavelet decomposition tree.

The length of lines is halved for each additional level in the Wavelet decomposition tree. In a single pass across the image at one resolution level, the transform engine 308 reads 2K+7 lines from external memory, and writes back K lines of the LL band, each of which has half as many samples as the input image. In this way, the engine processes 2K input lines. Every second time it does this, the transform engine 308 is invoked again to form subbands in the next lower resolution level, whose lines are half as long, so the number of sample transactions for the next level is one quarter as large.

Different scenarios for processing the subband samples will now be provided. In one scenario, the subband samples are written back to the external memory store 304 as they are generated. Once a sufficient number of lines of samples from a subband have been buffered, a block coding engine 310 codes an entire row of blocks. This allows the storage is can be recycled. However, for modest values of K, this buffering of subband code blocks in external memory 304 makes the largest impact on external memory bandwidth.

In some applications, external memory bandwidth may be a scarce resource; therefore, a second scenario is considered, in which the value of K is so large that the transform engine 308 actually produces entire code blocks incrementally as it moves across the image from left to right. In this second scenario, K≧H, which allows the code blocks to be buffered up internally (e.g., in internal SRAM 312). The blocks could be buffered in a separate external memory which is fast and small (e.g. external SRAM).

The transform engine 308 could use Daubechies 9/7 bi-orthogonal filters. Although the Wavelet transform is assumed to have an infinite number of resolution levels, with the typical Mallat decomposition, five or six resolution levels are used. Image samples are assumed to arrive from the application (compression) or are consumed by the application (decompression) one line at a time, starting from the top of the image and working toward the bottom. The original image samples are assumed to have 8-bit precision, while all subband samples and intermediate subband results (e.g. the intermediate LL bands in the decomposition) are maintained with 16-bit precision, including the sign bit. The sub-block may be set to 16×16.

Figure 15:
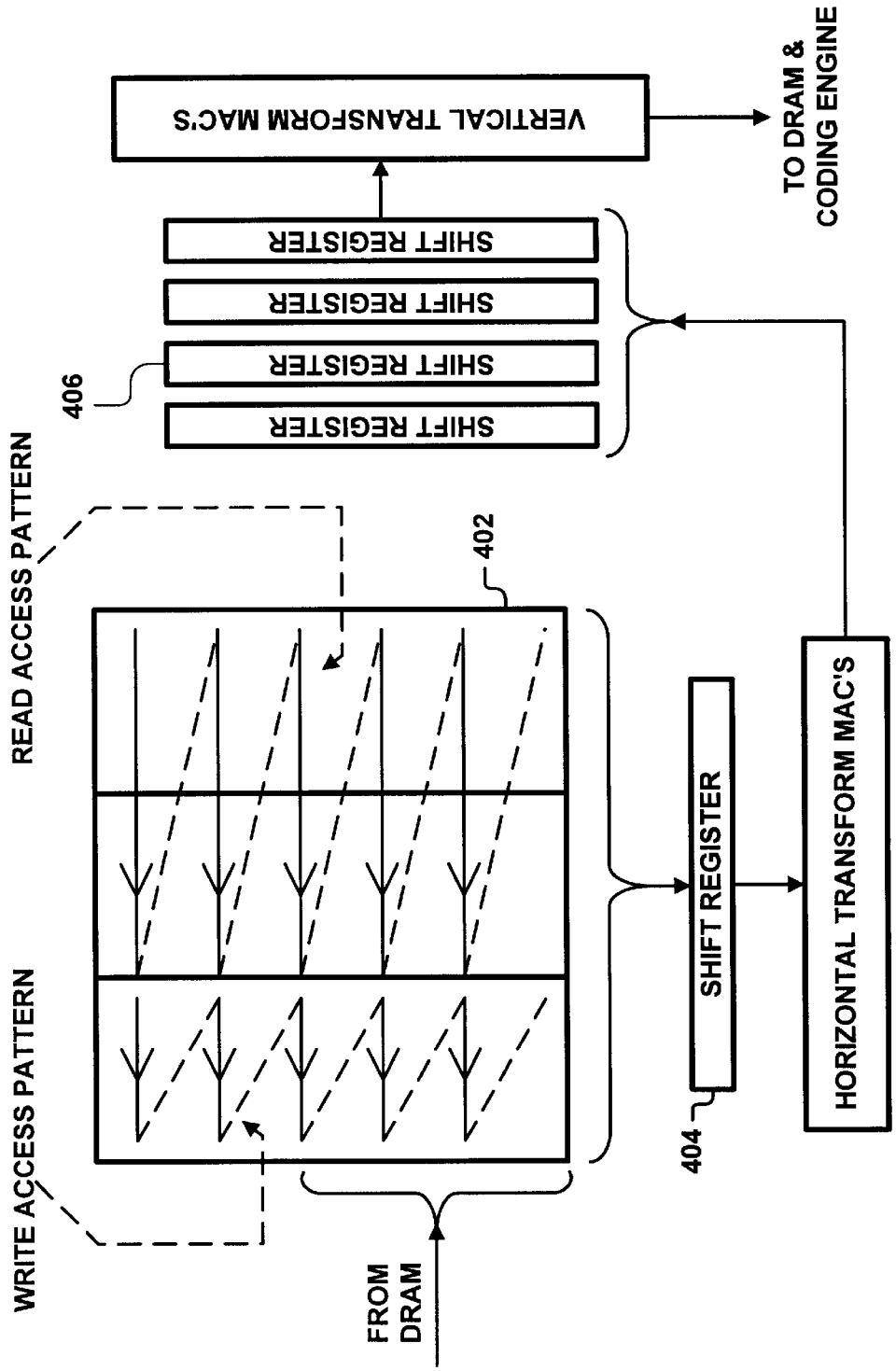
FIG. 15 is a block diagram of an exemplary transform engine for the apparatus of FIG. 14.

FIG. 15 illustrates an exemplary implementation of the Wavelet transform engine 308. The transform engine 308 reads each of 2K+7 input lines, four samples at a time, storing the samples in one of three internal memory banks 402. The three banks 402 may be rotated to ensure that two of the (2K+7)×4 memory banks always hold a full set of eight samples for each of the 2K+7 input lines, while the next four samples for each line are being read in. As soon as all twelve samples are available for any given row, they are passed through a 9-sample shift register 404 to generate four new horizontally transformed samples for each input line: two horizontal low-pass samples; and two horizontal high-pass samples. The input region of support for generating these four output samples is actually only eleven input samples. The four output samples are buffered in four separate 9-sample shift registers 406, which provide an output of the transform engine 308.

For every 2K×4 input samples which are processed, 4(2K+7) samples are written into the internal memory 312 and 11(2K+7) samples are read back from the internal memory 312. The transform engine 308 is also executed recursively on successively lower resolution levels.

Figure 16:
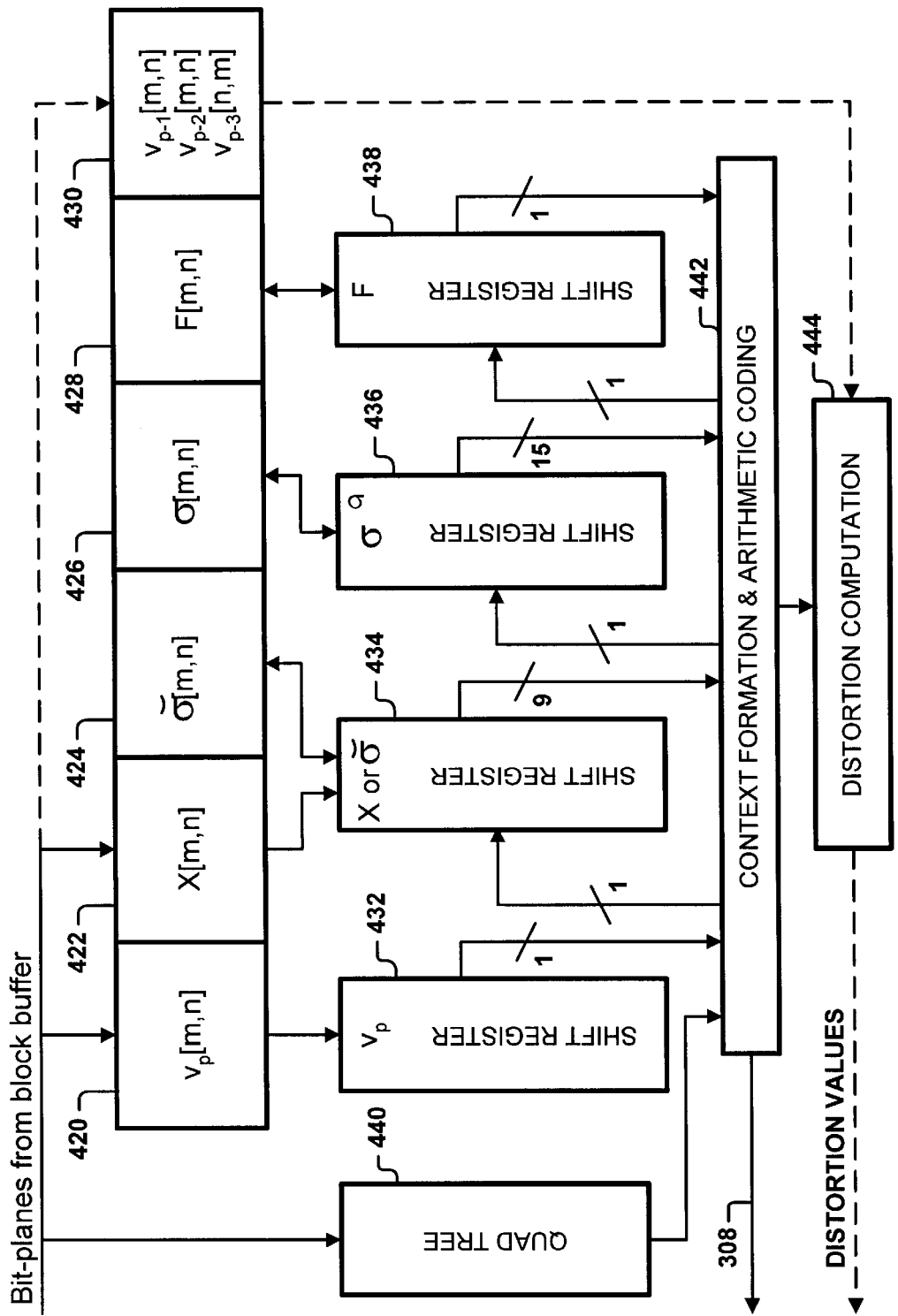
FIG. 16 is a block diagram of an exemplary block coding engine for the apparatus of FIG. 14.

FIG. 16 provides an illustration of an exemplary implementation of the block coding engine 310. The illustration is intended to give a flavor of the types of functional blocks and interactions which might be involved in a real implementation.

Not all bits in the relevant sample values are examined during each coding pass. Only a few state bits for each sample are maintained. The various coding passes have access to at most one magnitude bit-plane and the sign bit-plane. The code block samples may be stored in bit-plane order, rather than sample order at the output of the transform engine 308. The block coding algorithm is defined in terms of three state bits for every sample: o[m,n], o[m,n] and F[n,m]. Various shift registers maintain moving windows into a particular sub-block; the windows each span the width of the sub-block and advance either from the top to the bottom or vice versa, depending upon the particular coding pass being considered.

Shift registers 420 to 438 are used to simplify the implementation of a moving sample window which shifts from left to right or vice versa, depending upon the particular coding pass being considered. In this way, the only signals brought out of the shift registers are those which define the relevant state information in the neighborhood of a given sample. The size of the neighborhood is different for different types of information, which is reflected in the different shift register sizes. When a sample becomes significant, its sign bits are accessed within a 3×3 neighborhood (which explains why the sign-bit shift register is large enough to hold three rows of the sub-block with one additional sign bit beyond the left and right boundaries of the sub-block). During the Zero Coding operation, contexts are formed (via block 442) from a 3×5 neighborhood of significance state bits, which explains why the significance state shift register is large enough to hold three rows of the sub-block with two additional significance bits beyond the left and right boundaries of the sub-block.

Examples for the coding operations will now be provided. The examples for the coding operations are based on the following. The state of the shift registers is to be re-initialized on sub-block boundaries. For a sub-block containing 16 rows, a total of 18 rows of significance state bits and 18 rows of sign bits are read, whenever this information is needed during a coding pass. The state bits, sign-bits and magnitude bits are all packed into individually addressable bytes with a scan-line ordering within the block.

During a Forward Significance Propagation pass, a single 16×16 sub-block is processed by transferring the following information into the relevant shift registers: a) all 256 magnitude bits $v_p[m,n]$; b) 18 rows of (16+2) sign bits $X[m,n]$; and c) 18 rows of (16+4) significance bits $\sigma[m,n]$. The visited state bits $F[m,n]$ are reset to zero at the beginning of this pass and so need not be read in. At the same time, the following updated state information is written back out of the shift registers: a) all 256 significance bits $\sigma[m,n]$; and b) all 256 visited state bits $F[m,n]$.

The Backward Significance Propagation pass is virtually identical to the Forward Significance Propagation pass, except that the visited state information $F[m,n]$ is also be read from the internal memory 312.

During the Magnitude Refinement pass, a single 16×16 sub-block is processed by transferring the following information into the relevant shift registers: a) all 256 magnitude bits $v_p[m,n]$; b) 18 rows of (16+2) significance bits $\sigma[m,n]$; c) all 256 "previously refined" state bits $6[m,n]$; and d) all 256 visited state bits $F[m,n]$. At the same time, the updated "previously refined" state bits $\sigma[m,n]$ are written back out of the relevant shift register. Note that this is the only coding pass which accesses $\sigma[m,n]$ and that it does not require access to the sign bits; consequently, the shift register which normally maintains sign bits can be reused for this purpose.

During the Normalization pass, a single 16×16 sub-block is processed by transferring the following information into the relevant shift registers: a) all 256 magnitude bits $v_p[m,n]$; b) 18 rows of (16+2) sign bits $X[m,n]$; c) 18 rows of (16+4) significance bits $\sigma[m,n]$; and d) all 256 visited state bits $F[m,n]$. At the same time, the updated significance state bits, $\sigma[m,n]$, are written back out of the relevant shift register.

The distortion estimation may be implemented with the aid of a small logic circuit 444 or two very small lookup tables. The coding engine 310 may also incorporate a module for computing the minimum number of bits required to decode any leading subset of the symbols.

The quad tree coding engine, represented by block 440, has a negligible impact on complexity. The quad tree coding engine 440 finishes at the sub-block level, which leaves a total of only twenty nodes, even when working with code blocks of 64×64 samples. The quad tree coding engine 440 may be trivially implemented by maintaining two state bits with each node: one to represent whether or not the node was significant in a previous bit-plane; and one to represent whether or not the node is significant in the current bit-plane. The state information can be updated as each new bit-plane sample $v_p[m,n]$ is written into the internal memory 312, or at a variety of other points. Separate memory accesses are not performed by the quad-tree coding engine.

Thus disclosed is an invention that compresses data into an embedded bitstream and reconstructs the data from the embedded bitstream with greater scalability, random access, error resilience, bit rate control and coding efficiency. Scalability is better because the encoder constructs bitstreams that are optimized for decompression at a single bit-rate, at a small collection of well-defined bit rates (i.e., targeted scalability) or at any arbitrary bit-rate (i.e., generic scalability).

The availability of independently encoded embedded bitstreams for each block provides an efficient scheme for achieving a particular target bit-rate or reconstructed image distortion bound, without having to pass through the image more than once. Although multi-pass rate control schemes can give better compression performance for small images, they become quite impractical for large images such as those produced by modern scanners, or by satellite imagers. The ability to pass through the image once in raster-scan order, allows the compression process to proceed with only modest memory requirements and without the need to ever buffer up the entire image in the uncompressed or transformed domain.

Individual block bitstreams may be truncated before the entire image has been compressed, as a buffer size constraint is gradually approached. This is quite different from rate-control approaches which adjust a quantizer step size parameter as the buffer begins to fill up, because the decision to truncate a block's bitstream may be taken long after the block was initially coded when more information about the compressibility of other parts of the image is available. Moreover, blocks may be truncated multiple times, making only very conservative decisions at first.

The use of fractional bit-planes creates a more finely spaced set of available bit-rates and distortion values, and hence improves the performance of the post-compression rate-distortion optimization algorithm.

The encoder and decoder according to the present invention also have low complexity and low memory requirements. The distortion estimation does not add substantial complexity to the implementation of compression. Quantization is simple. Unlike encoders that scale a quantization step parameter in order to achieve some desired bit-rate, the encoder according to the present invention may use a constant base quantization step size for all images and all bit-rates. Moreover, any discrepancy between this base step size and an exact power of two can be absorbed into the Wavelet filter coefficients, so that the quantization operation is essentially eliminated.

Independent block coding provides very strong support for error resilience. Code bytes associated with each embedded bitstream may be assigned progressively lower priority; however, in the event that some of these bytes are lost or corrupted, the effect does not propagate beyond the boundary of the block. It is therefore possible to realize the benefits of prioritized significance as well as bounded influence to concoct a potent defense against transmission errors.

The independent block coding and syntax provides the ability to selectively decompress particular regions of the image and thereby support region-of-interest decoding. By performing block coding on a subband decomposition (that is, after the image has been decomposed), the invention does not produce poor compression and significant visible artifacts that have been known to occur in region-of-interest decoding in which the original image is divided into tiles and the tiles are independently compressed.

The invention provides better support for client-server applications, and greater flexibility for proprietary encoders to optimize the bitstream by exploiting "psycho-visual" properties without making any changes to the decoder or bitstream syntax.

The present invention is not limited to the applications described above. For example, the invention could be applied to satellite imagery. It may be used by any application that is compatible with the emerging JPEG-2000 compression standard.

The applications for SNR scalability are, of course, not limited to rate control; other important applications include progressive transmission, efficient distribution of images of heterogeneous networks, and error resilient image transmission.

Moreover, the invention is not limited to the specific embodiments described and illustrated above. Although the invention has been described in connection with subbands produced by a Wavelet transform, there is no a priori restriction to wavelet transforms or to any particular decomposition, such as the most common Mallat decomposition or other decompositions, such as "SPACL" and "PACKET".

The invention is not limited to any type of entropy encoding. Thus, the invention is not limited to any type of arithmetic ZC, RLC, SC and MR coding operations for each coding pass of a bit-plane.

Therefore, the invention is not limited to the specific embodiments described and illustrated above. Instead, the invention is construed according to the claims that follow.

What is claimed is:

1. A method for processing a plurality of subbands of a subband decomposition, the method comprising:
    partitioning each subband into a plurality of disjoint blocks;
    dividing each block into a plurality of disjoint sub-blocks; and
    coding the blocks bit-plane by bit-plane, the blocks of each subband being coded independently of each other;
    wherein a given bit-plane of a block is coded by arithmetically coding the bit-plane bit of each sub-block that is significant with respect to the given bit-plane.

2. The method of claim 1, wherein transform coefficients of the blocks are quantized prior to coding, a constant base quantization being used as a step size.

3. The method of claim 1, wherein a multi-level quad tree decomposition is performed on each block to identify significant transform coefficients in the blocks.

4. The method of claim 1, wherein each bit-plane is coded in multiple passes, sub-blocks containing significant coefficients with respect to a previous bit-plane being coded on all but a final pass, sub-blocks containing significant coefficients with respect to a current bit-plane being coded on the final pass.

5. The method of claim 4, wherein the multiple passes include a Forward Significance Propagation coding pass, a Backward Significance Propagation coding pass, a Magnitude Refinement coding pass, and a Normalization coding pass.

6. The method of claim 4, wherein the bit-plane coding is performed by using arithmetic coding operations including Zero Coding, Run-Length Coding, Sign Coding and Magnitude Refinement.

7. The method of claim 1, further comprising generating a block bitstream for each block; gathering distortion statistics about each of the blocks as the blocks; and using the distortion statistics to identify candidate truncation points for each of the block bitstreams.

8. The method of claim 7, wherein a given bitstream is truncated by determining rate-distortion slopes at different truncation points of the given bitstream.

9. The method of claim 8, wherein distortion reduction incurred during a single coding pass is determined by the steps including summing outputs of $f_s(\cdot)$ whenever a sample becomes significant and by summing outputs of $f_m(\cdot)$ whenever a magnitude is refined.

10. The method of claim 1, wherein context during the coding is shared among sub-blocks of a block.

11. A method for processing a plurality of subbands of a subband decomposition, the method comprising:
    partitioning each subband into a plurality of disjoint blocks;
    coding the blocks of each subband, a block bitstream being generated for each block;
    ordering a plurality of the block bitstreams into a layered, embedded bitstream; and
    adding a block bitstream syntax to the layered bitstream, the syntax allowing different types of processing to be performed on the same block bitstreams.

12. The method of claim 11, wherein the layered bitstream includes multiple layers, wherein each layer corresponds to a discrete bit rate, and wherein portions of the block bitstreams are ordered according to bit rate.

13. The method of claim 11, wherein the layered bitstream includes multiple layers, wherein the layers correspond to different levels of image resolution, and wherein portions of the block bitstreams are ordered according to image resolution.

14. The method of claim 11, wherein the bitstream syntax includes a plurality of tag bocks for each layer, each tag block identifying portions of corresponding block bitstreams, the tag blocks being organized according to a tag tree structure.

15. The method of claim 11, wherein the bitstream syntax includes a sequence of code bits for each layer, each sequence of code bits identifying the block bitstream portions that are included from each subband, each sequence of code bits further providing information concerning the maximum bi-depth, truncation point, and number of code bytes being sent for each included code block.

16. Apparatus for generating an embedded bitstream from image data, the apparatus comprising:
    a transform engine for performing a frequency-based transform of the image data, each frequency-based component produced by the transform including a plurality of disjoint blocks of transform coefficients; and
    a coding engine for dividing each block into a plurality of disjoint sub-blocks; and coding the blocks bit-plane by bit-plane independently of other blocks within the same component, wherein a given bit-plane of a block is coded by arithmetically coding the bit-plane bit of each sub-block that is significant with respect to the given bit-plane.

17. The apparatus of claim 16, wherein the coding engine uses a multi-level quad tree decomposition to determine whether each sub-block contains significant coefficients.

18. The apparatus of claim 16, wherein each bit-plane is coded in multiple passes, sub-blocks containing significant coefficients with respect to a previous bit-plane being coded on all but a final pass, sub-blocks containing significant coefficients with respect to a current bit-plane being coded on the final pass.

19. The apparatus of claim 18, wherein the multiple passes include a Forward Significance Propagation coding pass, a Backward Significance Propagation coding pass, a Magnitude Refinement coding pass, and a Normalization coding pass.

20. The apparatus of claim 18, wherein the bit-plane coding is performed by using arithmetic coding operations including Zero Coding, Run-Length Coding, Sign Coding and Magnitude Refinement.

21. The apparatus of claim 16, wherein the coding engine also generates a block bitstream for each block; gathers distortion statistics about each of the blocks as the blocks are being coded; and, after the blocks have been coded, uses the distortion statistics to identify candidate truncation points for each of the block bitstreams.

22. The apparatus of claim 21, wherein a given bitstream is truncated by determining rate-distortion slopes at different truncation points of the given bitstream.

23. The apparatus of claim 22, wherein distortion reduction incurred during a single coding pass is determined by the steps including summing outputs of $f_s(\cdot)$ whenever a sample becomes significant and by summing outputs of $f_m(\cdot)$ whenever a magnitude is refined.

24. The apparatus of claim 16, wherein the coding engine quantizes transform coefficients of the blocks prior to coding, a constant base quantization being used as a step size.

25. Apparatus for generating an embedded bitstream from image data, the apparatus comprising:

a transform engine for performing a frequency-based transform of the image data, each frequency-based component produced by the transform including a plurality of disjoint blocks of transform coefficients; and a coding engine for coding the blocks independently of other blocks within the same component, the coding engine generating an individual bitstream for each block, the coding engine ordering a plurality of block bitstreams into a layered, embedded bitstream, and adding a block bitstream syntax to the layered bitstream, the syntax allowing different types of processing to be performed on the same block bitstreams.

26. The apparatus of claim 25, wherein the layered bitstream includes multiple layers, wherein each layer corresponds to a discrete bit rate, and wherein portions of the block bitstreams are ordered according to bit rate.

27. The apparatus of claim 25, wherein the layered bitstream includes multiple layers, wherein the layers correspond to different levels of image resolution, and wherein portions of the block bitstreams are ordered according to image resolution.

28. The apparatus of claim 25, wherein the bitstream syntax includes a plurality of tag bocks for each layer, each tag block identifying portions of corresponding block bitstreams, the tag blocks being organized according to a tag tree structure.

29. The apparatus of claim 25, wherein the bitstream syntax includes a sequence of code bits for each layer, each sequence of code bits identifying the block bitstream portions that are included from each subband, each sequence of code bits further providing information concerning the maximum bit-depth, truncation point, and number of code bytes being sent for each included code block.

30. A method for processing a plurality of subbands of a subband decomposition, the method comprising:

partitioning each subband into a plurality of disjoint blocks;

coding the blocks bit-plane by bit-plane, the blocks of each subband being coded independently of each other; and generating a block bitstream for each block;

gathering distortion statistics about each of the blocks as the blocks are being coded; and using the distortion statistics to identify candidate truncation points for each of the block bitstreams.

31. The apparatus of claim 30, wherein each bitstream is truncated by determining rate-distortion slopes at different truncation points of the given bitstream.

32. The apparatus of claim 30, wherein distortion reduction incurred during a single coding pass is determined by steps including summing outputs of $f_s(\cdot)$ whenever a sample becomes significant and by summing outputs of $f_m(\cdot)$ whenever a magnitude is refined.

* * * * *